Feb. 20, 1962 R. C. SWANEY 3,022,047

STABIL-HEAT DRIER

Filed Nov. 4, 1957 17 Sheets-Sheet 1

INVENTOR

Robert Casper Swaney,

BY John B. Brady

ATTORNEY

INVENTOR
Robert Casper Swaney,
BY John B. Brady
ATTORNEY

INVENTOR
Robert Casper Swaney,
BY John B. Brady
ATTORNEY

INVENTOR
Robert Casper Swaney,
BY John A. Brady
ATTORNEY

INVENTOR

Robert Casper Swaney,

BY John B. Brady

ATTORNEY

INVENTOR
ROBERT CASPER SWANEY
BY John B. Brady
ATTORNEY

Feb. 20, 1962 R. C. SWANEY 3,022,047

STABIL-HEAT DRIER

Filed Nov. 4, 1957 17 Sheets-Sheet 7

INVENTOR

BY Robert Casper Swaney,

John B. Brady ATTORNEY

INVENTOR

Robert Casper Swaney,

BY John B. Brady

ATTORNEY

INVENTOR
Robert Casper Swaney,
BY
John B. Brady
ATTORNEY

INVENTOR
Robert Casper Swaney,
BY
John B. Brady
ATTORNEY

Feb. 20, 1962 R. C. SWANEY 3,022,047

STABIL-HEAT DRIER

Filed Nov. 4, 1957 17 Sheets-Sheet 11

INVENTOR

Robert Casper Swaney,

BY John B. Brady

ATTORNEY

Feb. 20, 1962 R. C. SWANEY 3,022,047

STABIL-HEAT DRIER

Filed Nov. 4, 1957 17 Sheets-Sheet 12

INVENTOR

Robert Casper Swaney,

BY

John B. Brady

ATTORNEY

Feb. 20, 1962 R. C. SWANEY 3,022,047

STABIL-HEAT DRIER

Filed Nov. 4, 1957 17 Sheets-Sheet 13

INVENTOR

Robert Casper Swaney,

BY

John B. Brady

ATTORNEY

Feb. 20, 1962 R. C. SWANEY 3,022,047

STABIL-HEAT DRIER

Filed Nov. 4, 1957 17 Sheets-Sheet 14

INVENTOR

Robert Casper Swaney,

BY

John B. Brady

ATTORNEY

INVENTOR
Robert Casper Swaney,
BY
John B. Brady
ATTORNEY

INVENTOR
Robert Casper Swaney,
BY John B. Brady
ATTORNEY

Feb. 20, 1962 R. C. SWANEY 3,022,047

STABIL-HEAT DRIER

Filed Nov. 4, 1957 17 Sheets-Sheet 17

INVENTOR

Robert Casper Swaney,

BY

John B. Brady

ATTORNEY

United States Patent Office 3,022,047

Patented Feb. 20, 1962

3,022,047
STABIL-HEAT DRIER
Robert Casper Swaney, Carlisle, Pa.
Filed Nov. 4, 1957, Ser. No. 694,333
13 Claims. (Cl. 257—95)

My invention relates broadly to heat exchange and more particularly to a system of roll driers by which heat transfer through the surface of a drum may be effected with high efficiency.

One of the objects of my invention is to provide a heat exchange system for roll type driers in which a rapid response to temperature control is secured by use of a relatively low mass of heat transfer medium within the apparatus in relation to the total mass of the apparatus where the heat transfer medium is moving at high velocity in relation to relatively small cavities within the roll drier.

Another object of my invention is to provide a heat exchange system for roll type driers in which a heat transfer medium is passed through the roll drier at high velocity under conditions of very low resistance, whereby very sensitive and accurate temperature control of the surface area of the roll within certain predetermined dimensional areas may be effected.

Still another object of my invention is to provide a construction of drum type drier roll in which a very high heat transfer rate may be secured due to high velocities of a heat transfer medium within the drum under conditions of turbulence of the heat transfer medium and under conditions of multiple shear within the heat transfer medium between a Stabil-drum and the drier roll.

Another object of my invention is to provide means for accurately controlling the circulation of flow pattern of the heat transfer medium within a drier roll for assuring uniform or controlled and efficient heat transfer within the drier roll.

Another object of my invention is to provide a construction of Stabil-heat drier in which high temperature or low temperature heat transfer may be effected under conditions of the lowest practical pressures at substantially the same efficiency over the entire heat transfer range.

Other and further objects of my invention reside in the structure of a Stabil-drum and an associated drier roll in various embodiments set forth more clearly in the following specification by reference to the accompanying drawings, in which.

Figures 1, 44:
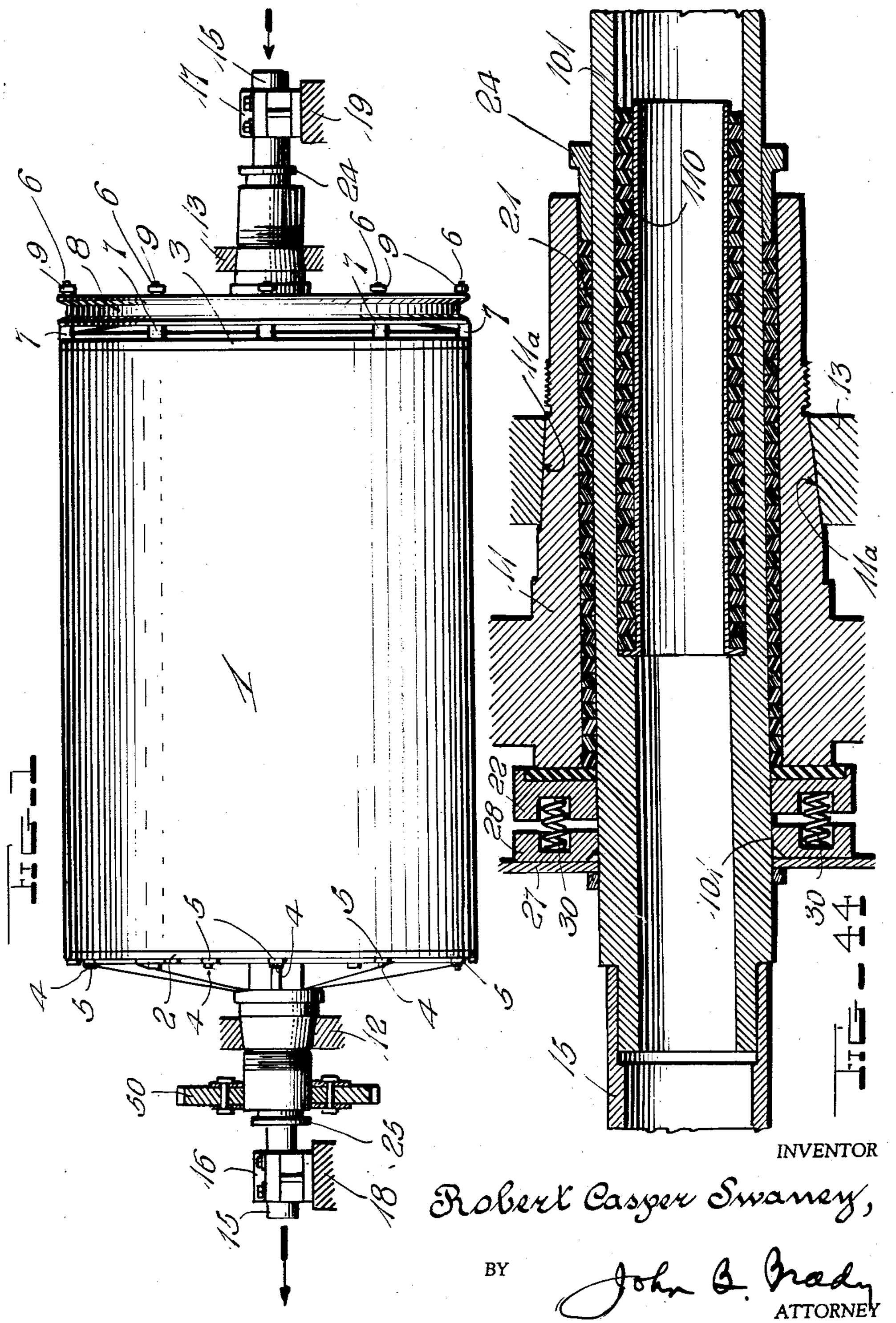
FIG. 1 is a side elevational view of a typical embodiment of the Stabil-heat drier of my invention, showing schematically the separate driving means for the Stabil-drum and the drier roll.
Figures 2, 14, 15, 16:
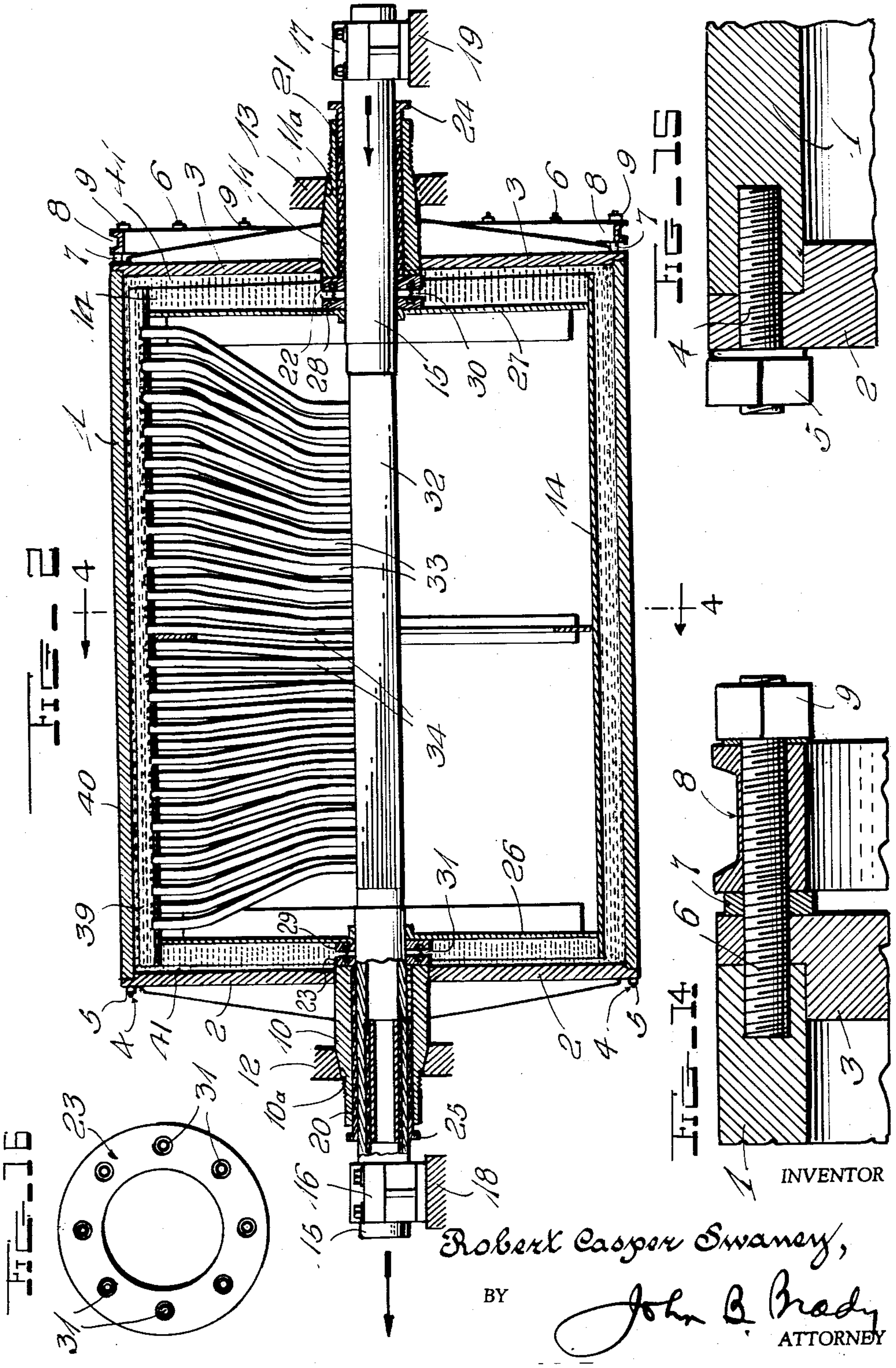
FIG. 2 is a longitudinal sectional view through the assembly of the Stabil-drum and the drier roll and illustrating an arrangement of heat transfer means therebetween.
Figure 3:
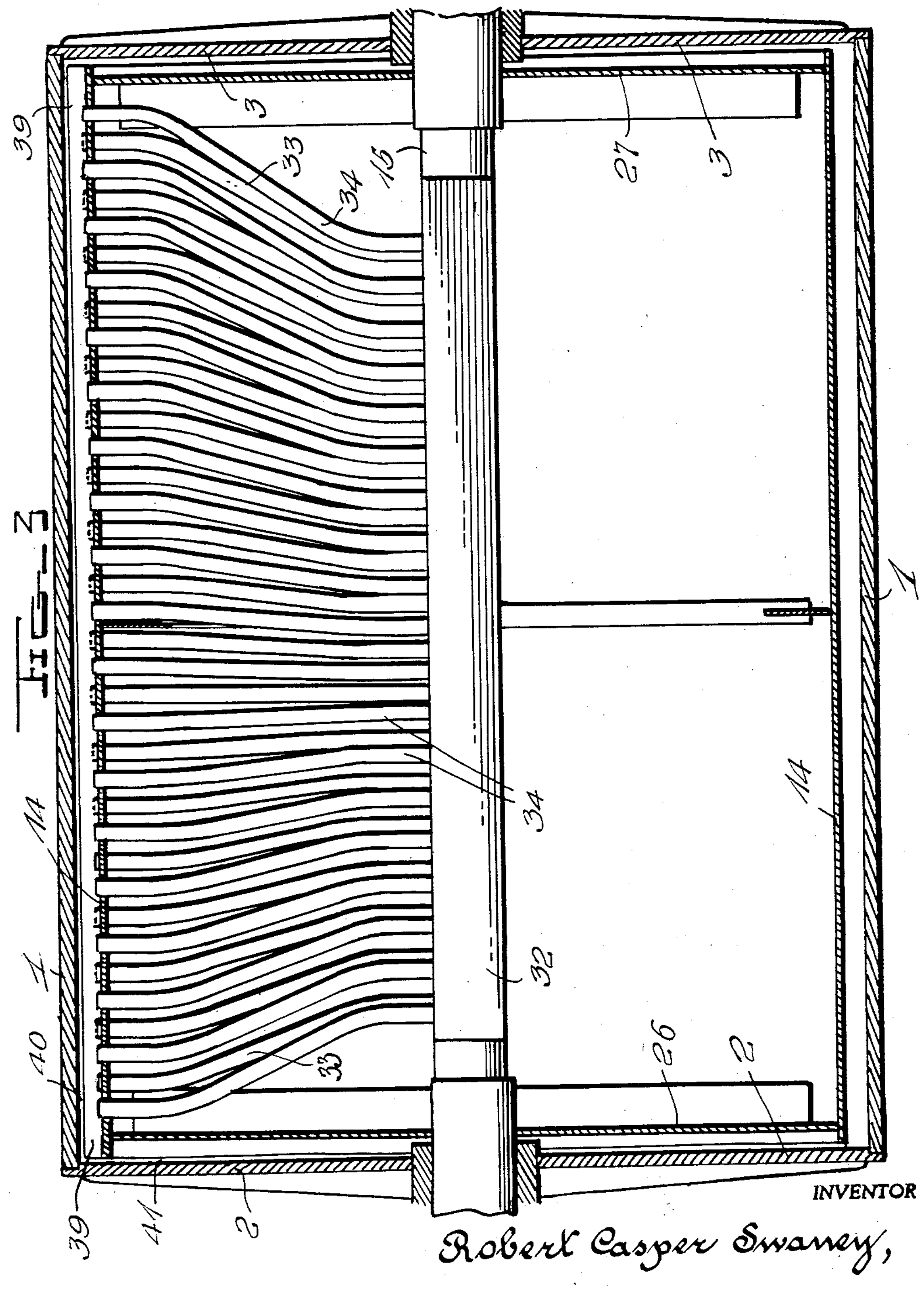
FIG. 3 is a view similar to the view shown in FIG. 2 but drawn to a larger scale with certain parts omitted for clarification.
Figure 17:
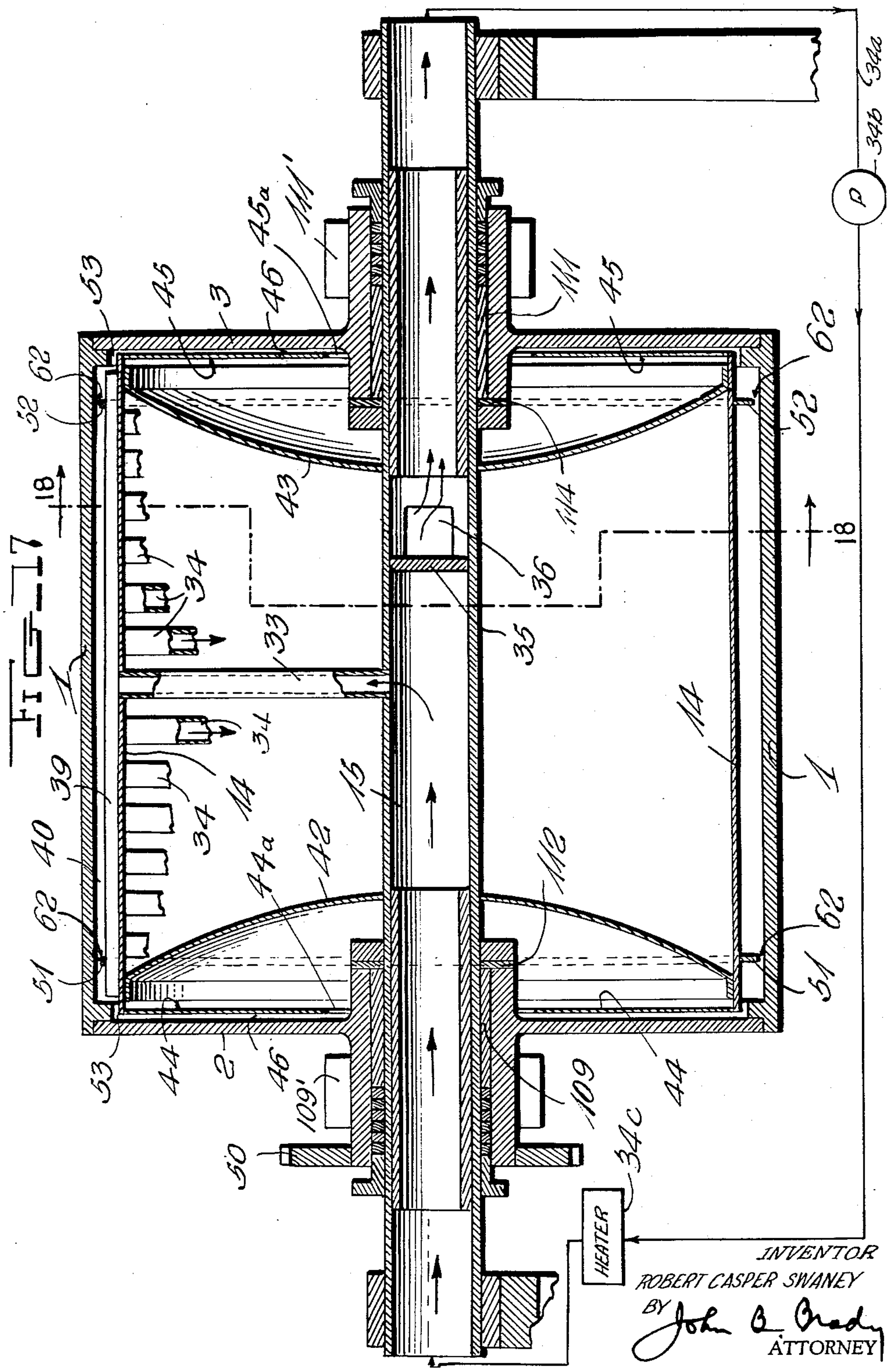
Figures 18, 20, 21, 22, 23:
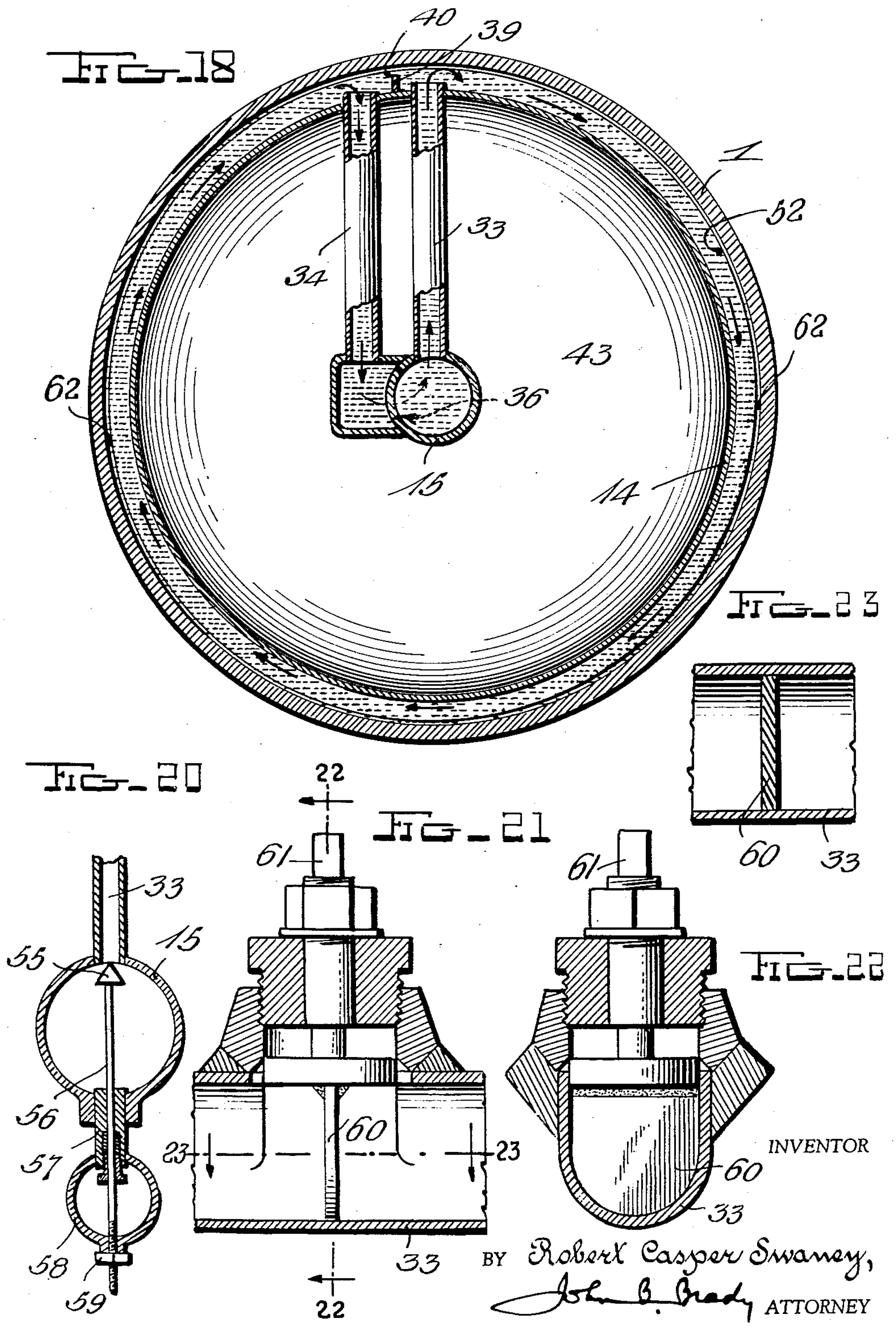
Figures 19, 19A:
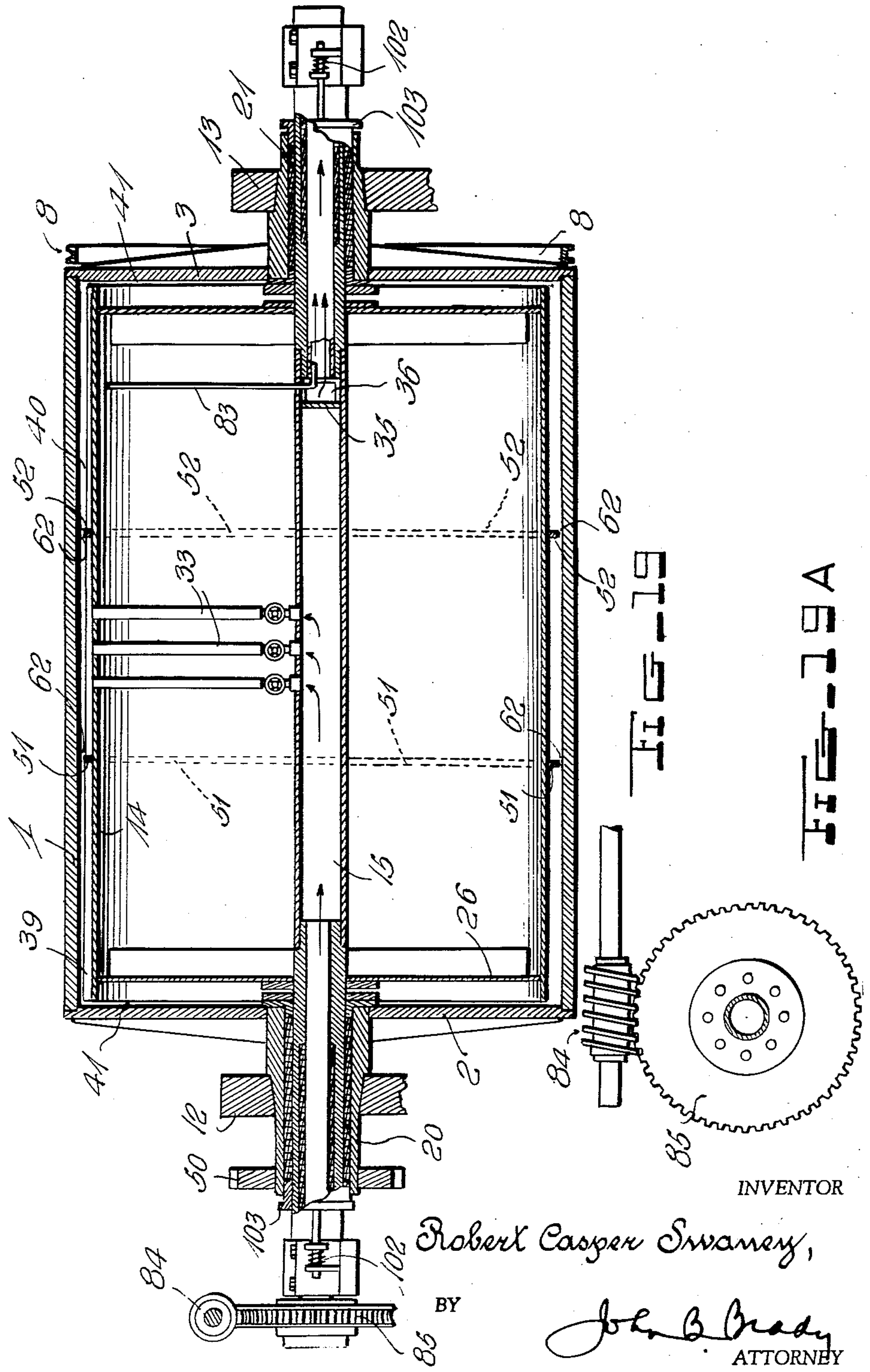
Figures 24, 25, 26:
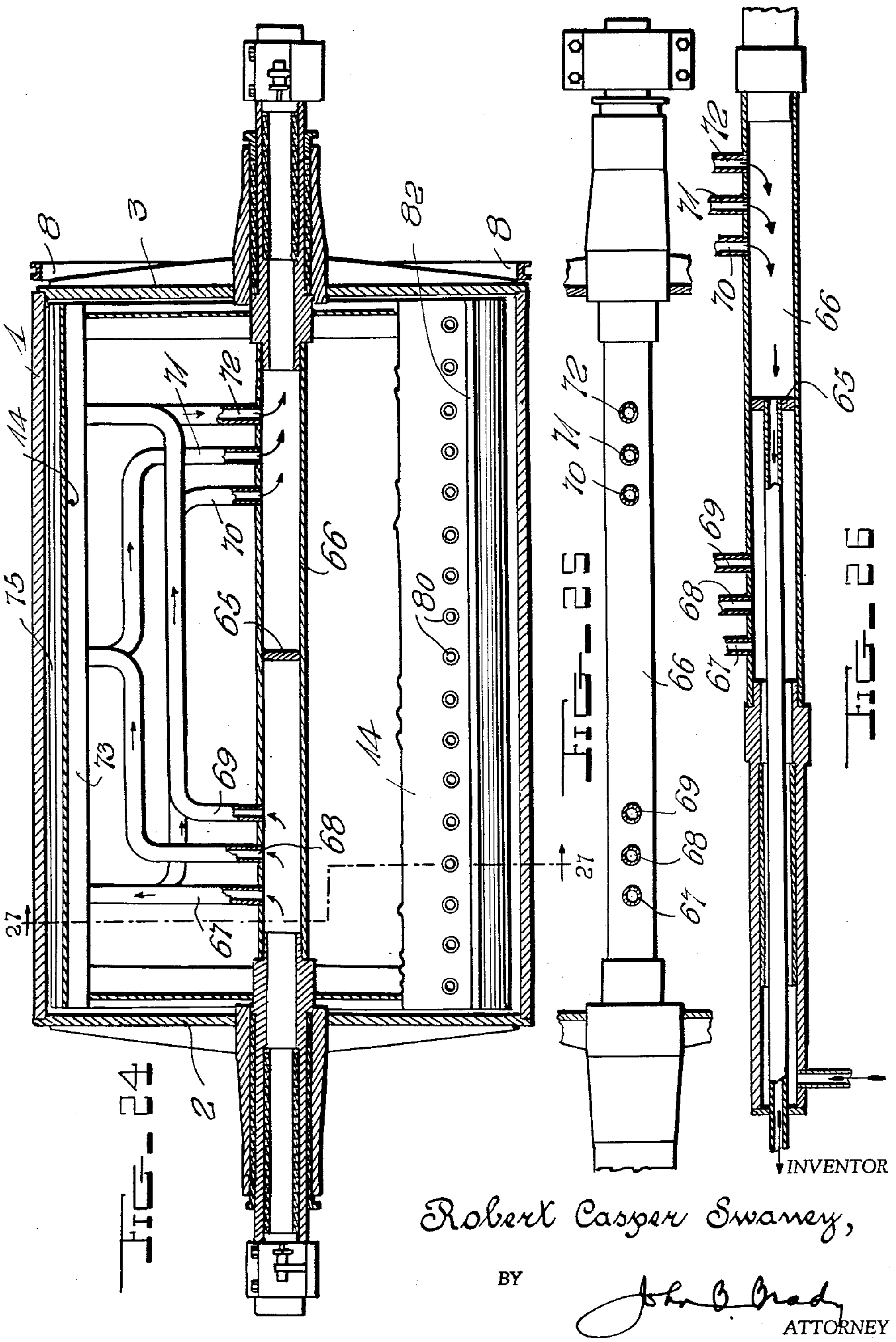
Figures 27, 30, 31:
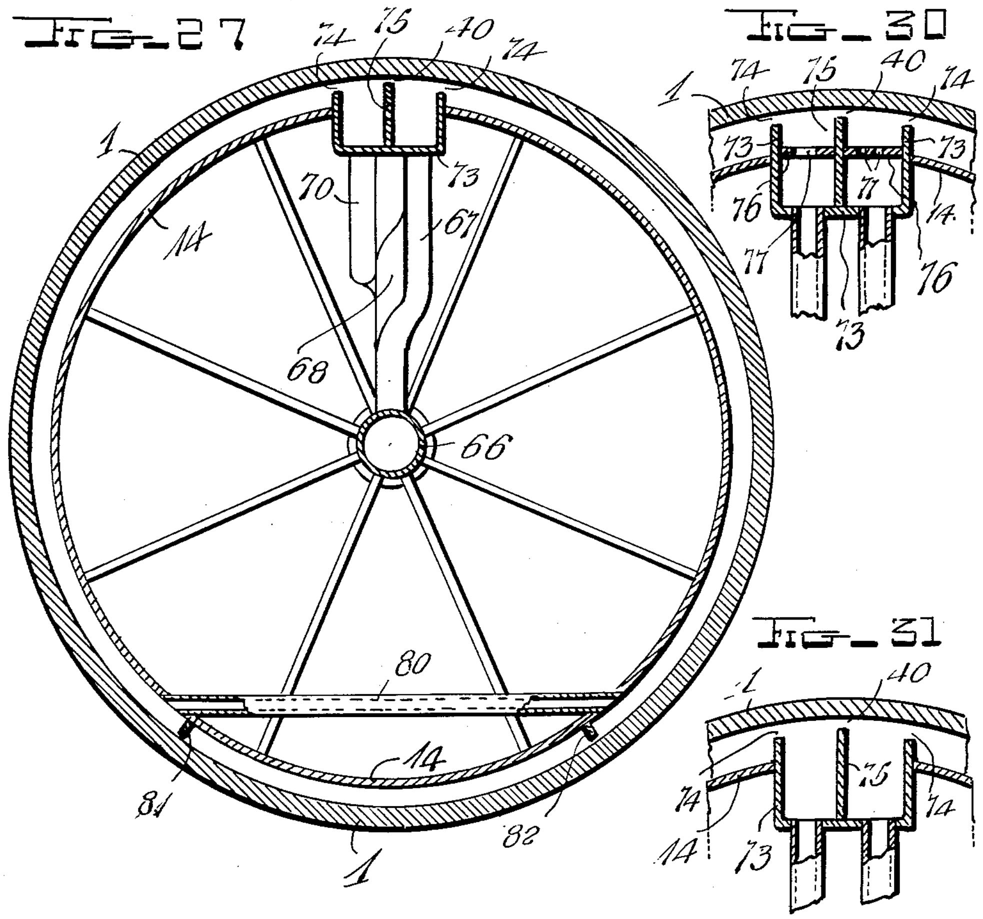
Figures 28, 29:
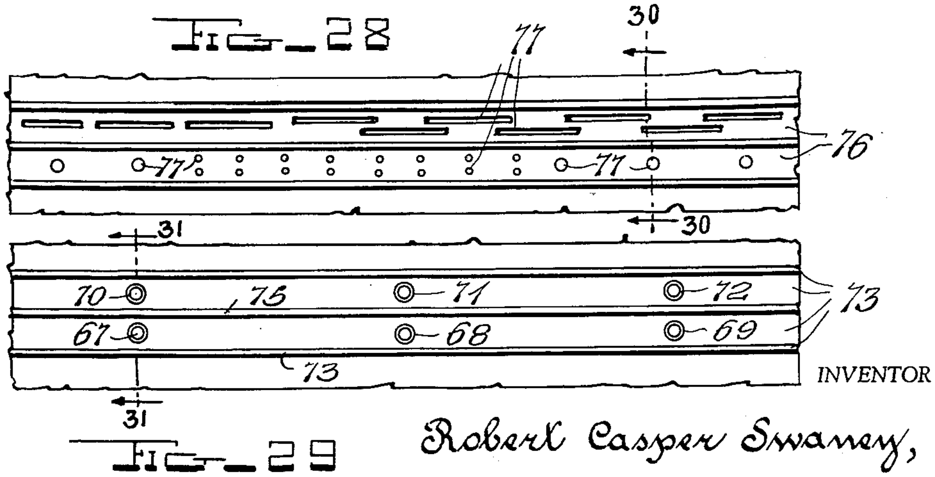
Figure 31A:
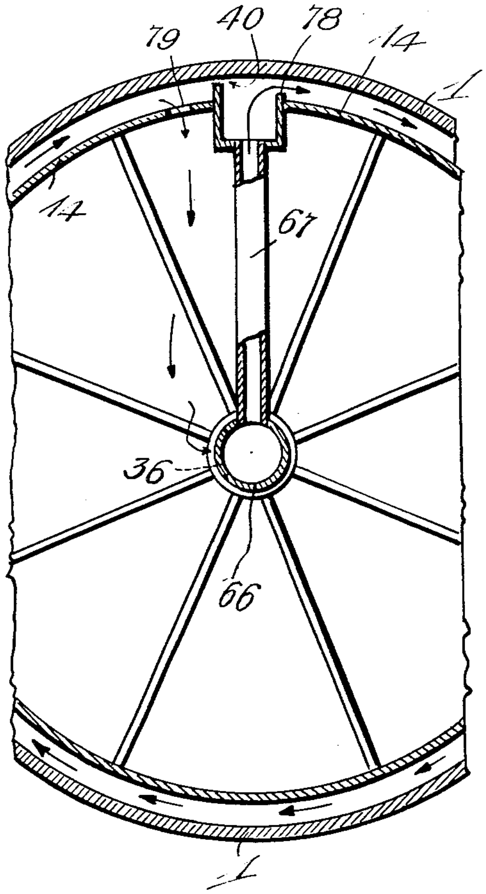
Figure 56:
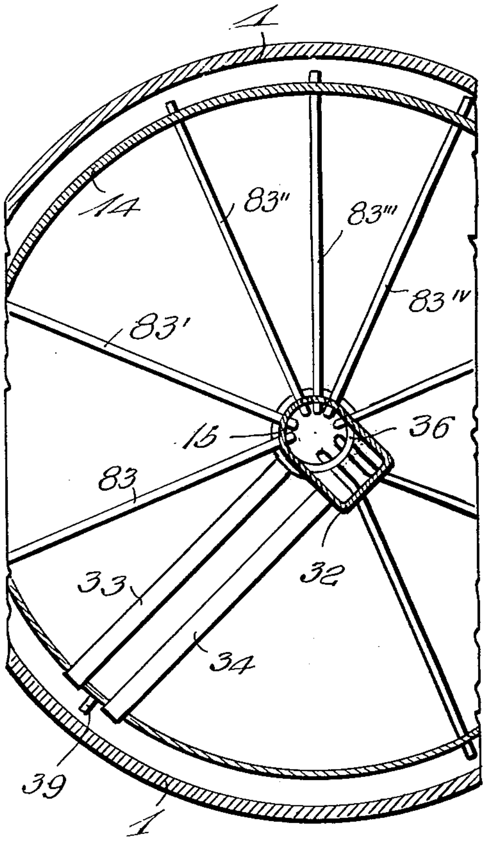
Figures 57, 58:
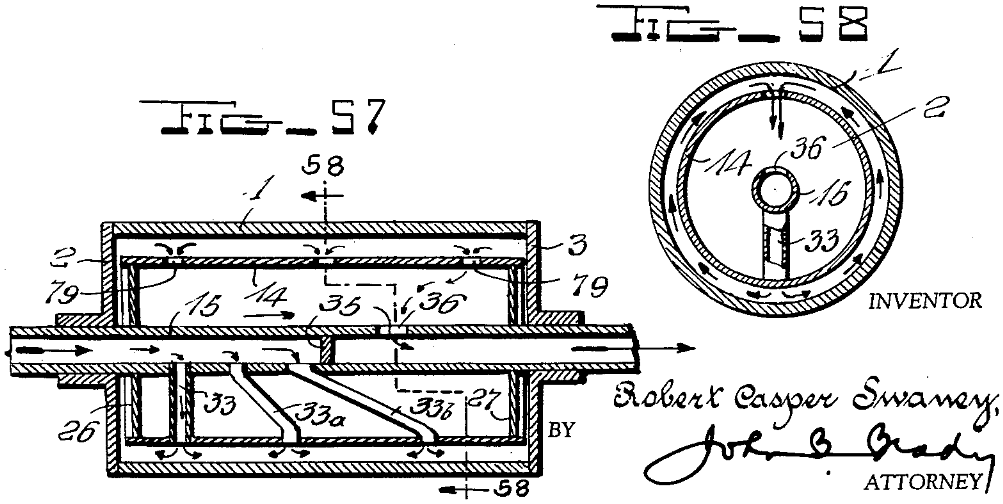
Figures 32, 33, 34:
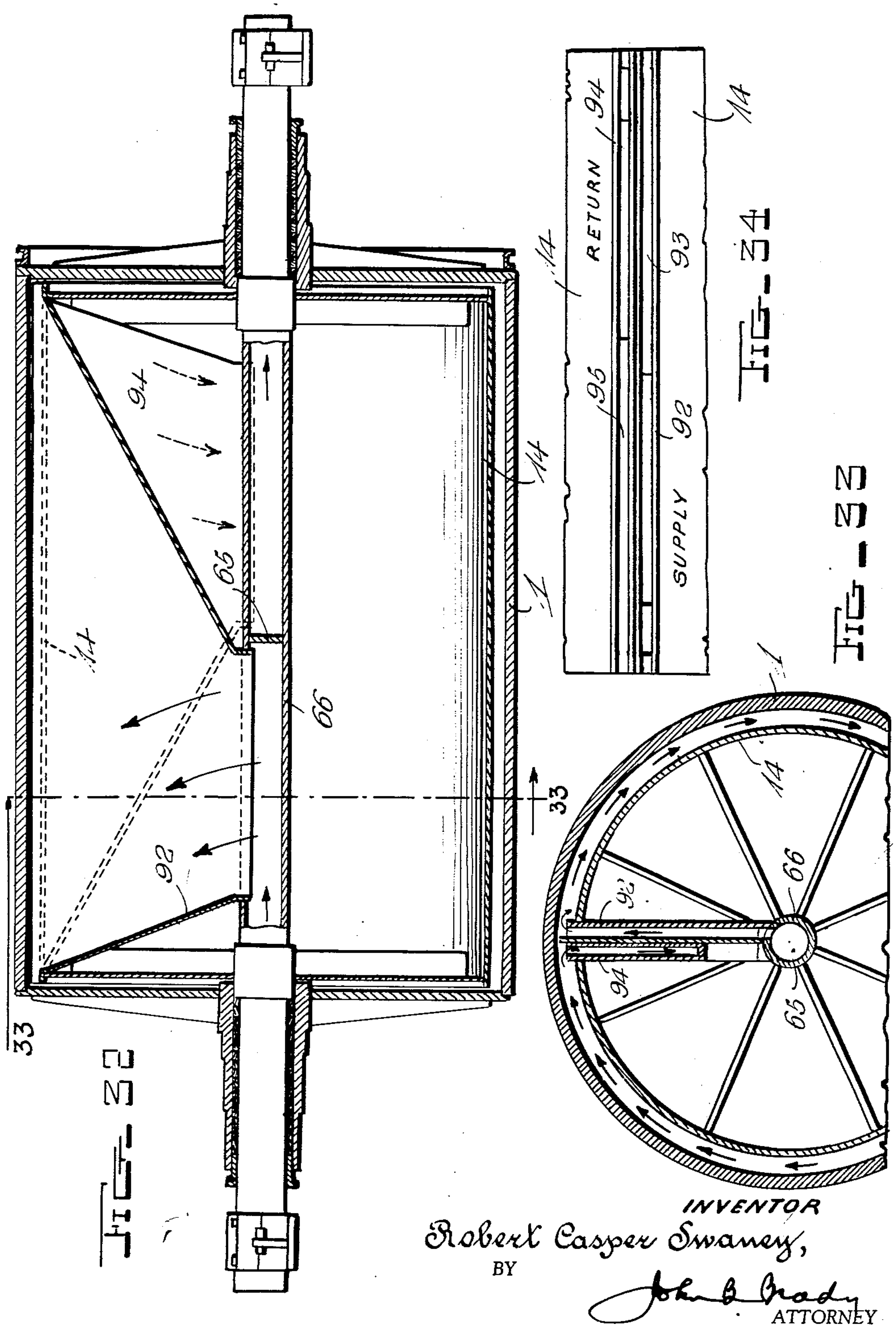
Figure 35:
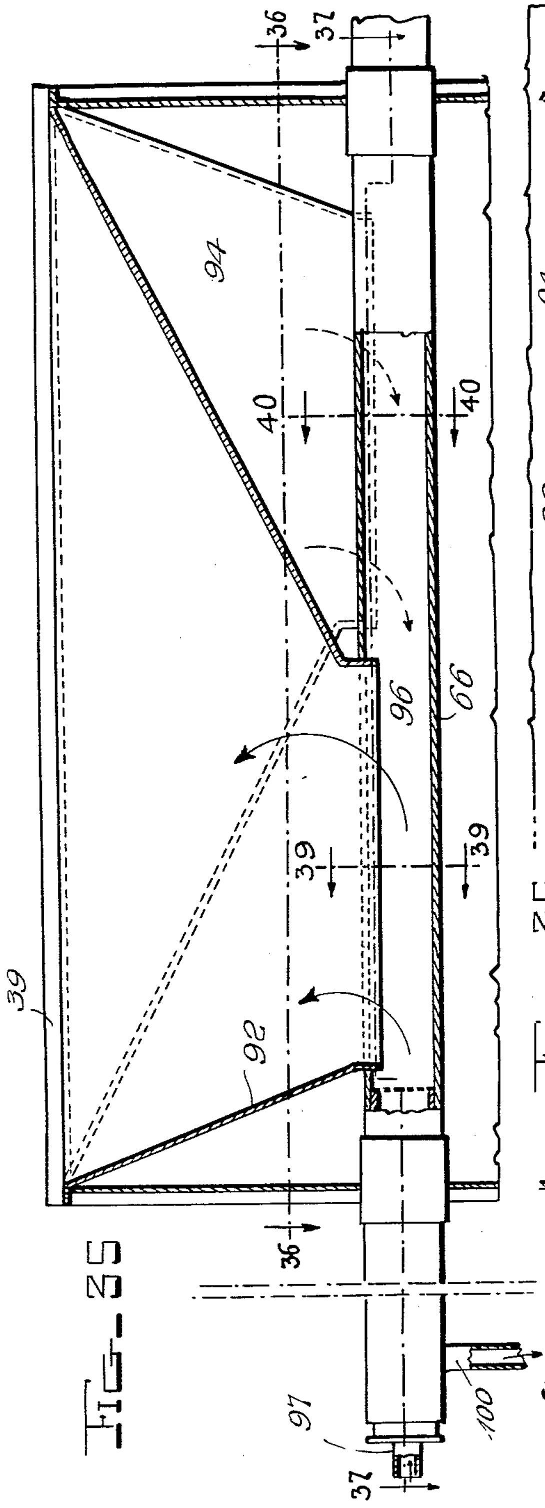
Figure 36:
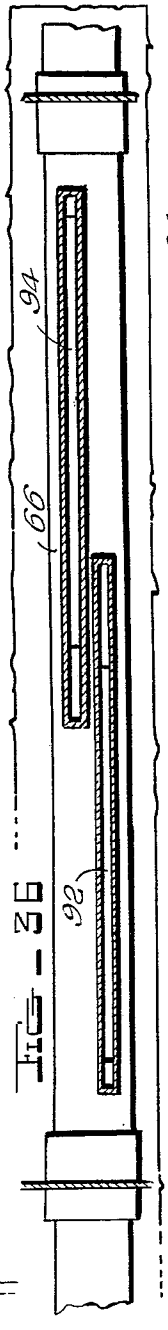
Figure 37:
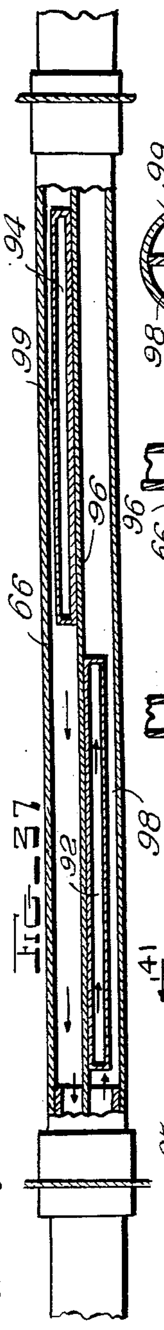
Figures 38, 39, 40, 41:
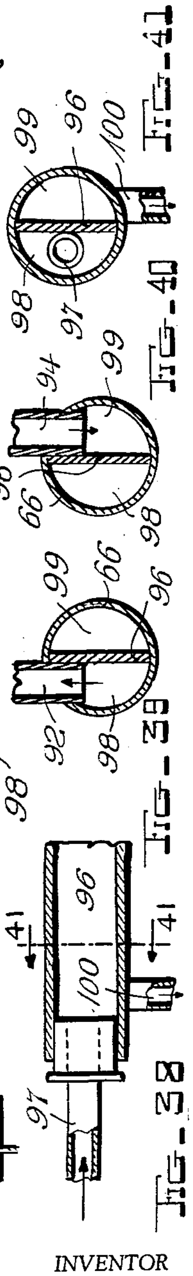
Figure 42:
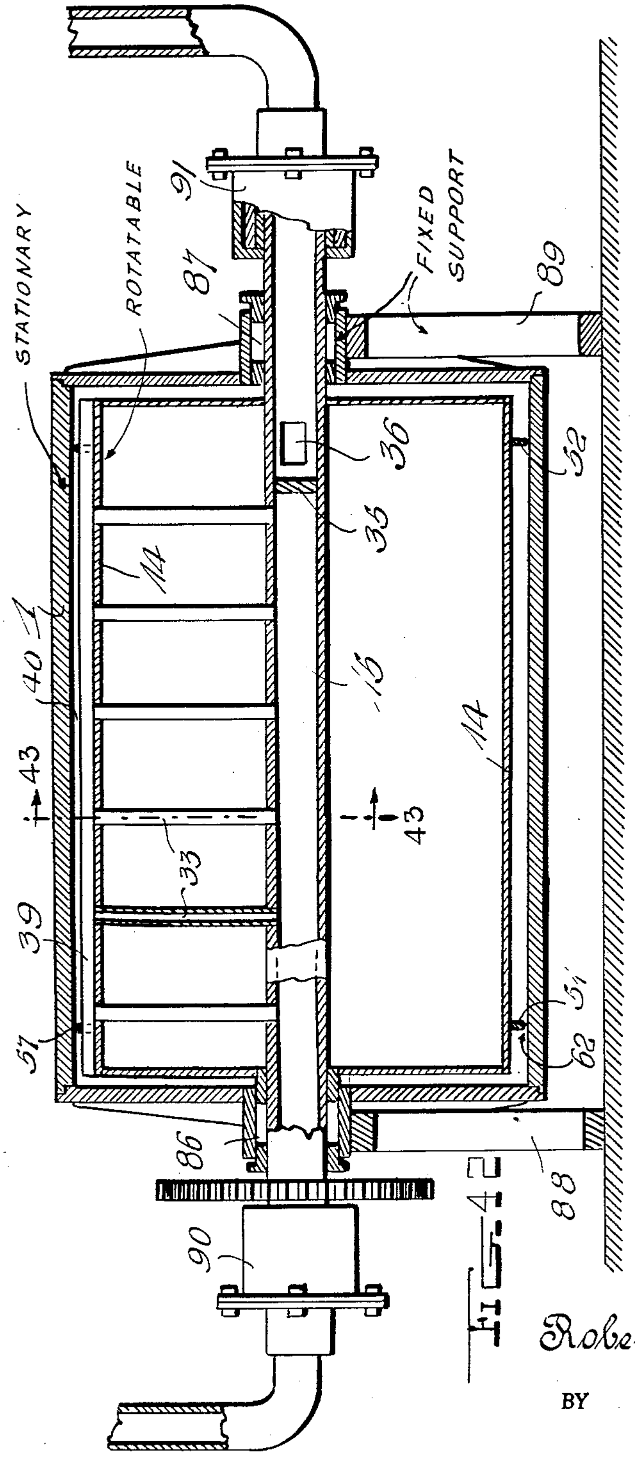
Figure 43:
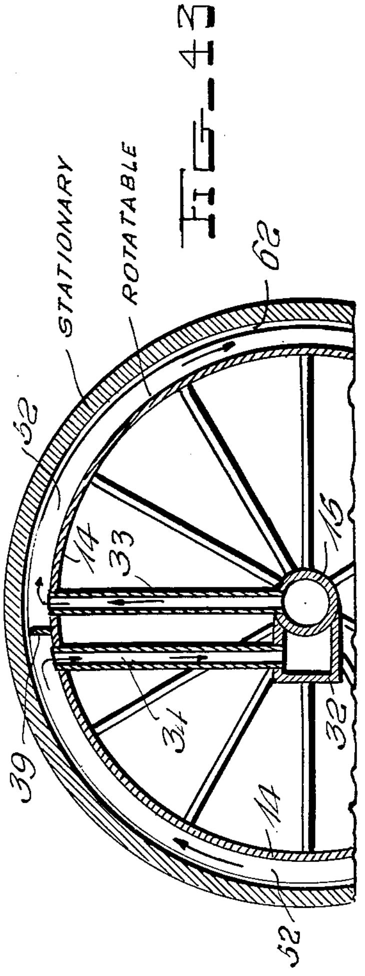
Figures 45, 55:
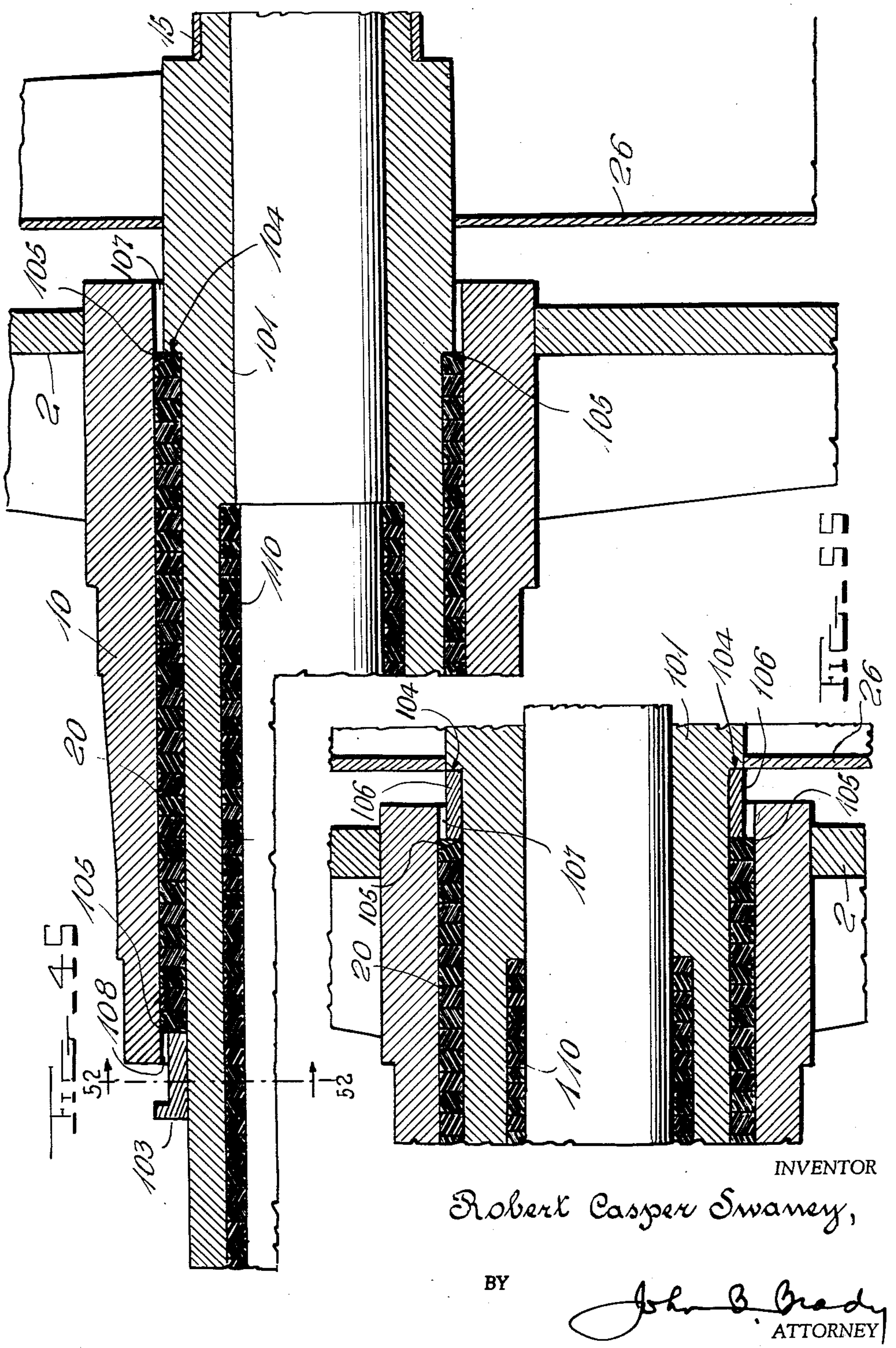
Figure 46:
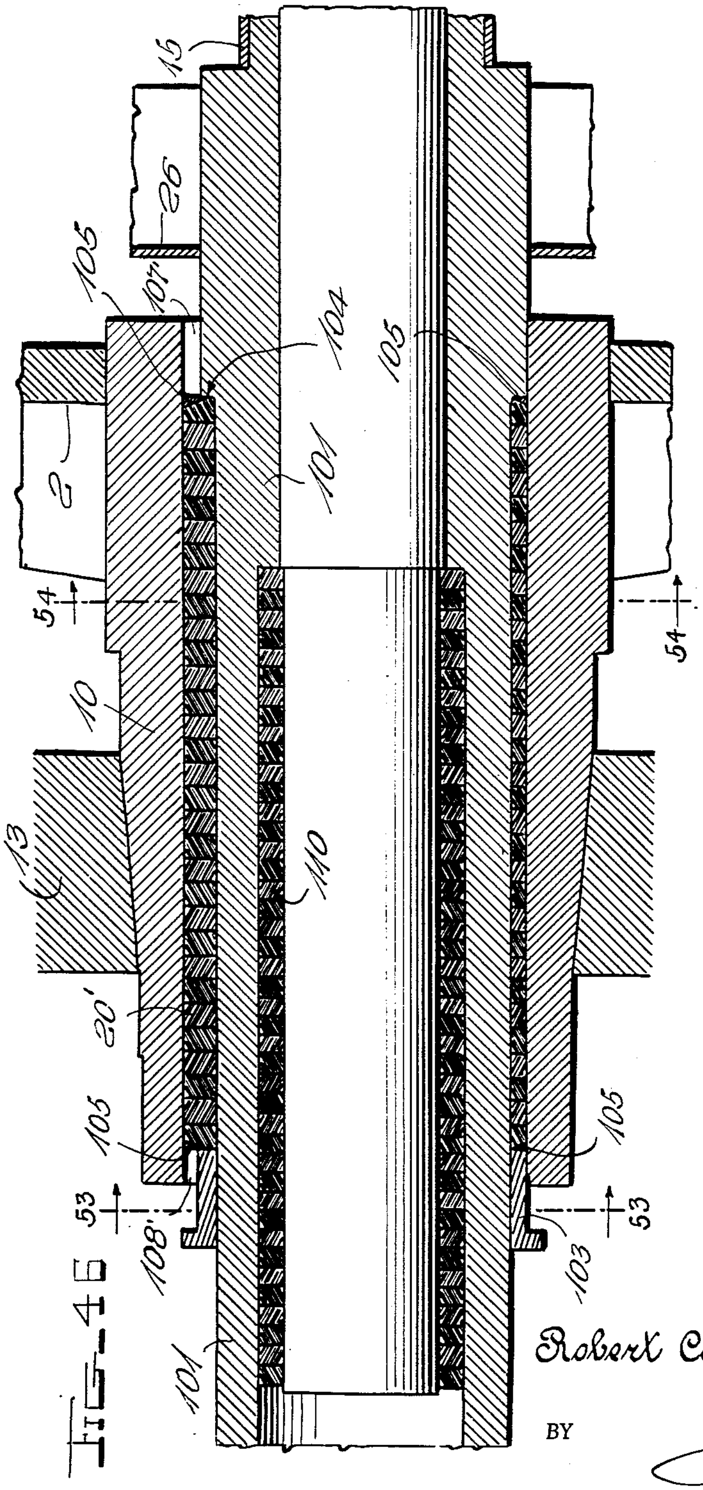
Figure 51:
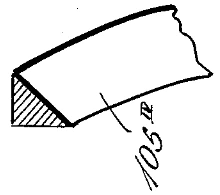
Figure 50:
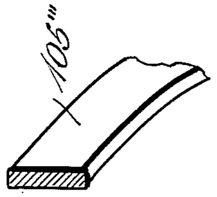
Figure 49:
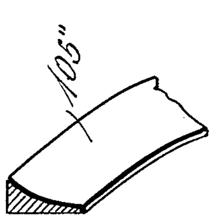
Figure 48:
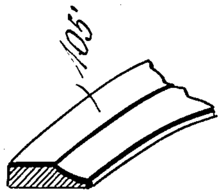
Figure 47:
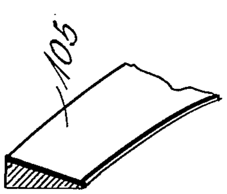
Figures 13, 52, 53, 54:
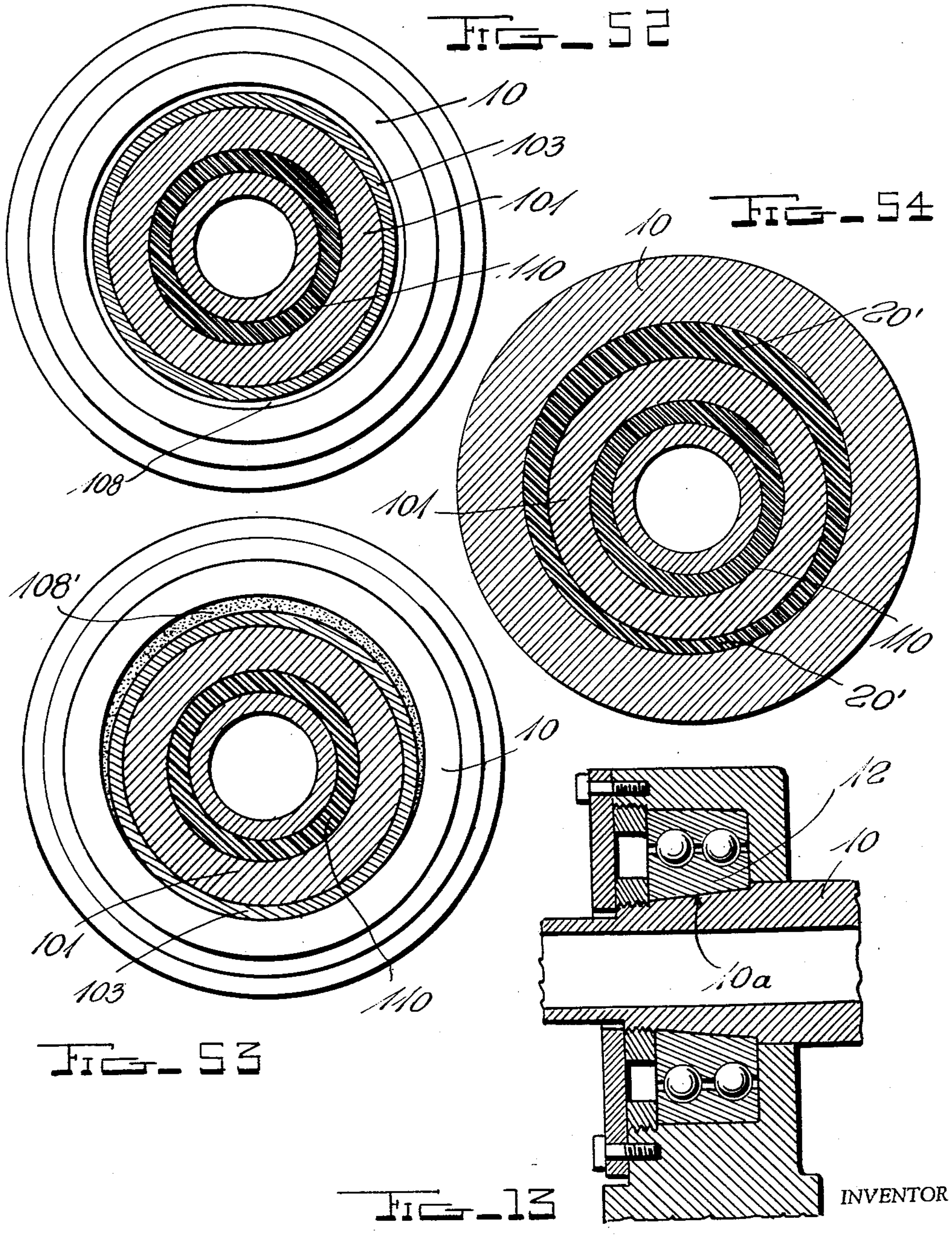

FIG. 13 schematically illustrates one of the anti-friction ball bearings provided for rotatably journaling the drier roll;

FIG. 14 is a fragmentary enlarged cross-sectional view illustrating the manner in which the rope run which drives the drier roll is fastened to the drier roll;

FIG. 15 is an enlarged cross-sectional view showing the manner of removably connecting the heads to opposite ends of the drier roll;

FIG. 16 is an elevational view showing the recesses of the packing retainer ring engaging springs extending from the corresponding back-up ring between the journaled heads of the Stabil-drum and the drier roll;

FIG. 17 is a schematic longitudinal sectional view through a modified form of Stabil-heat drier embodying my invention and illustrating the principles involved in securing control temperature over a predetermined area of the drier roll particularly suitable for paper machines;

FIG. 18 is a vertical sectional view taken substantially on line 18—18 of FIG. 17;

FIG. 19 is a longitudinal sectional view taken through a modified form of Stabil-heat drier embodying my invention wherein metering valves are provided for localizing the distribution of heat over predetermined areas of the drier roll;

FIG. 19A is an end elevational view of an indexing or adjusting mechanism for setting the Stabil-drum in predetermined axial positions;

FIG. 20 is an enlarged longitudinal sectional view taken through one of the metering valves used in the structure of FIG. 19;

FIG. 21 illustrates a modified form of metering valve which may be employed in lieu of the valve illustrated in FIG. 20;

FIG. 22 is a cross-sectional view through the valve of FIG. 21 on line 22—22 thereof;

FIG. 23 is a cross-sectional view through the metering valve of FIG. 21 on line 23—23 thereof;

FIG. 24 is a longitudinal sectional view taken through a further modified form of roll type drier embodying my invention;

FIG. 25 is a fragmentary plan view of the central shaft of the roll type drier illustrated in FIG. 24;

FIG. 26 is a fragmentary longitudinal sectional view taken through a modified form of central shaft which may be used in the structures of FIGS. 24 and 25 for circulating the heat transfer medium where the heat transfer medium is introduced and emitted through the same end of the roll structure;

FIG. 27 is a cross-sectional view taken on line 27—27 of FIG. 24;

FIG. 28 is a fragmentary plan view of a portion of the surface of the Stabil-drum interiorly of the drier roll showing the arrangement of the distributing headers in the embodiment of my invention shown in FIGS. 24–27;

FIG. 29 is a fragmentary plan view of the distributing and collecting headers in the surface of the Stabil-drum interiorly of the drier roll shown in FIGS. 24–28, illustrating particularly the connection between the conduits for the heat transfer medium and the headers;

FIG. 30 is a fragmentary transverse sectional view taken substantially on line 30—30 of FIG. 28;

FIG. 31 is a fragmentary cross-sectional view taken substantially on line 31—31 of FIG. 29;

FIG. 31A is a transverse sectional view through a modified form of my invention where the path for circulation of the heat transfer medium extends through ports in the surface of the Stabil-drum;

FIG. 32 shows a further modified form of Stabil-heat drier embodying my invention, utilizing a two-compartment box header supply and return distribution system for the heat transfer system;

FIG. 33 is a fragmentary transverse sectional view taken substantially on line 33—33 of FIG. 32;

FIG. 34 is a fragmentary plan view at the surface of the Stabil-drum of FIGS. 32 and 33, interiorly of the drier roll, showing the two-compartment box header supply and return of the heat transfer system;

FIG. 35 is a fragmentary longitudinal sectional view through a further modified form of Stabil-drum for Stabil-heat drier of the type illustrated in FIGS. 32–34 but showing the structural arrangement of the Stabil-drum section where the supply and return for the heat transfer medium are both located at the same end of the structure;

FIG. 36 is a fragmentary longitudinal sectional view taken on line 36—36 of FIG. 35;

FIG. 37 is a fragmentary longitudinal sectional view taken substantially on line 37—37 of FIG. 35;

FIG. 38 is a fragmentary view of the stuffing box at one end of the roll structure of FIGS. 35–37 illustrating the manner in which the heat transfer medium is supplied through the same end of the roll structure;

FIG. 39 is a transverse sectional view on line 39—39 of FIG. 35;

FIG. 40 is a transverse sectional view on line 40—40 of FIG. 35;

FIG. 41 is a transverse sectional view on line 41—41 of FIG. 38;

FIG. 42 is a longitudinal sectional view through a further modified form of Stabil-heat drier embodying my invention where the drier roll is maintained stationary on fixed supports while the Stabil-heat drum is journaled for rotation with respect to the drier roll and the heat transfer medium supplied to the Stabil-heat drum through rotary joints;

FIG. 43 is a fragmentary transverse sectional view taken on line 43—43 of FIG. 42;

FIG. 44 is a cross-sectional view through the fluid pipe packing particularly adapted for the rotatable mounting of the structure of FIGS. 1–3 of my invention;

FIG. 45 is a fragmentary longitudinal sectional view taken through the displacement stuffing box particularly intended for the forms of my invention illustrated in FIGS. 17–41;

FIG. 46 is a view similar to the view shown in FIG. 45, but illustrating the manner in which the packing of FIG. 45 is displaceable to accommodate deflections in the Stabil-drum shaft;

FIG. 47 is a fragmentary cross-sectional view of one of the deflection seal rings embodied in the displacement stuffing box illustrated in FIGS. 45 and 46;

FIG. 48 shows a modified section of deflection seal ring;

FIG. 49 shows a further modified section of deflection seal ring;

FIG. 50 illustrates in section another modified form of deflection seal ring;

FIG. 51 is a view of a still further modified form of deflection seal ring which may be used in the displacement stuffing box assembly of FIGS. 45 and 46;

FIG. 52 is a vertical sectional view taken substantially on line 52—52 of FIG. 45 and illustrating the normal operating condition of the displacement stuffing box;

FIG. 53 is a cross-sectional view taken on line 53—53 of FIG. 46 and showing the deflected position of the displacement stuffing box;

FIG. 54 is a cross-sectional view taken on line 54—54 of FIG. 46 and further illustrating the displaced condition of the packing in the displacement stuffing box under the conditions of shaft deflection illustrated in FIG. 46;

FIG. 55 shows a modified form of displacement stuffing box employed in the structures of my invention;

FIG. 56 is a transverse sectional view through a form of Stabil-heat drier embodying my invention utilizing a multiplicity of eductor tubes;

FIG. 57 is a longitudinal sectional view through a Stabil-heat drier showing schematically the basic construction embodied in all of the forms of my invention set forth herein; and FIG. 58 is a transverse sectional view on line 58—58 of FIG. 57.

Among the common types of heat exchangers are conventional roll driers (dry cans), Yankee driers and flaking rolls which are hollow cylindrical vessels with which paper or other materials are brought in contact therewith to perform the work or function of drying, heating or cooling of the said paper or other materials. These units are usually heated from the inside using steam or some other vapor under pressure; or cooled in similar manner usually under high pressure or vacuum. Temperature in vapor systems is a function of pressure but since the temperature increase is disproportionate to the pressure increase practicable pressure limits are soon reached; presently about 150 p.s.i.g. for saturated steam which has a relatively low temperature. In such vapor systems the cooling effect is accomplished by evaporating a liquid to a vapor; and heating is accomplished by condensing a vapor to a liquid. It has long been held that an evaporating liquid or condensing vapor, because of the latent heat between the two phases, provided the best means of heat transfer because the heat transfer medium remains at a constant temperature. In the simplest of apparatus this is infallible, but in instances where high production and accurate control of temperature and heat transfer are demanded in the more complex processes such as drying paper, chemicals and textiles that tenet has many disadvantages.

My invention provides an improvement thereupon in which heat transfer media are circulated around inside the rolls in a controlled manner to apply heat thereto or to cool by removing heat therefrom. The heat transfer media are usually liquid although they may be gas or superheated vapor and the heat transfer is that of sensible heat rather than latent heat of evaporation or condensation; however, with modifications, my invention can be used with evaporating liquid or condensing vapor.

Since roll driers and Yankee driers are usually carried and revolved on journals and bearings at their axes, the practicable points of inlet and outlet are via hollow journals or shafts fitted with rotary joints or seals. To effect the highest efficiency of such apparatus it must be completely filled with whatever heat transfer medium is being used. In the case of steam or other vapors this creates a problem because of air or insoluble gases that can become trapped within the roll. In the case of a condensing vapor the condensate must be removed as rapidly as it is formed which often requires considerable complicated apparatus to perform the scavenging and condensate return operation. With the general availability of suitable liquid heat transfer media that do not vaporize, and hence do not change phase during heating and cooling even at atmospheric pressure and at temperatures as high as 650° F. which is equal in temperature to more than 2000 p.s.i.g. saturated steam pressure, it is much simpler, cheaper and more efficient to heat or cool such apparatus (driers) with liquid heat transfer media, because said heating or cooling can be accomplished with very little pressure on the system, often less than 15 p.s.i.g. on the user (drier), because the only pressure that is required is that necessary to circulate the heat transfer medium through the system. Maintenance is much less because many such liquid heat transfer media are non-corrosive whereas many vapors are to some degree corrosive. Furthermore, all heat is sensible heat (no latent heat of vaporization or condensation is involved) and hence direct temperature sensing instruments and controls simplify and greatly increase the accuracy of temperature control and heat transfer. My invention is also a decided improvement over conventional rolls (driers) when used with condensing vapors (requiring some slight changes and additions to facilitate condensate recovery), super-heated vapors or gases because of the unique and improved directed manner in which heat transfer media are circulated through and in contact with the heat transfer surfaces of the apparatus.

Basically, my invention involves a displacement element, insert or drum, which I named the Stabil-drum, because I can find no simple term which describes it. Usually, the Stabil-drum is a hollow gas-and-liquid-tight, cylindrical, barrel-like vessel fixedly mounted on a hollow shaft or hollow journals, displaced within the drier roll, having its hollow shaft (which I named the Stabil-shaft) or hollow journals extended through the hollow journals of the drier roll for outboard support, because the Stabil-drum may be supported externally and independently of the drier roll, and the drier roll may be supported by its hollow journals in the drier roll heads on bearings which permit the drier roll to revolve around outside the Stabil-drum. Or, the drier roll may be revolved on bearings, within the drier roll heads, mounted on the Stabil-shaft or hollow journals of the Stabil-drum.

Although the support of the drier roll and Stabil-drum on their respective bearings and outboard supports is a common arrangement, usually the drier roll is revolved on bearings or even the packings installed in journals or shaft extensions. In fact some instances do not even require packings and the drier roll journals can run on the Stabil-drum journals or shaft extensions. Furthermore, the roll and Stabil-drum may both revolve in opposite directions; or, in the same direction at different speeds. In certain instances the drier roll may be stationary and the Stabil-drum may revolve within the drier roll.

Ordinarily the heat transfer medium flows around the external surfaces of the Stabil-drum and the internal surfaces of the drier roll but there are variations of the flow or circulating patterns as will be explained hereinafter. The construction of the drier roll must usually be gas, vapor or liquid tight, and hence the heads must be welded or gasketed and fastened by some suitable means such as bolts, nuts or like devices. The Stabil-drum may remain stationary, except for positioning or alignment, and its shaft ends or journals in combination with the hollow journals of the drier roll provide excellent means for sealing because they are used to form stuffing boxes; as will be described hereinafter.

Hereinafter to save words and space, the term "heat transfer medium" will be referred to simply "HTM," as an abbreviation.

The heat transfer medium is circulated through one of the hollow shaft ends or hollow journals of the Stabil-drum. The hollow shaft or support for the Stabil-drum is partitioned or plugged intermediate its inlet and discharge ends to direct the circulating HTM around the inside of the drier roll.

My invention also provides a construction of stuffing box for sealing the journal between the drier roll shaft and the Stabil-drum shaft where packing is provided which withstands the temperatures and pressures involved and permits shaft deflections under relatively wide tolerances.

Referring to the drawings in detail, FIGS. 1–12 show one form of my invention wherein reference character 1 designates the drier roll closed at opposite ends by heads 2 and 3. Head 2 is secured in position by fastening screws 4 which are screwthreaded into internally screwthreaded recesses in the peripheral end of drier roll 1 and secured by nuts 5. The head 3 is secured in position by screws 6 which are fastened in spaced recesses around the periphery of the end of the drier roll 1 and extend through the spacer member 7 and through the rope run 8 wherein the ends of the screws 6 are engaged by nuts 9.

The heads 2 and 3 are mounted on outwardly projecting hollow journals 10 and 11 which include tapered portions 10*a* and 11*a* for mounting the anti-friction bearings 12 and 13 shown more clearly in FIG. 13.

The Stabil-drum is shown at 14, supported upon the Stabil-shaft 15, which is hollow for the passage of HTM and which is supported in the bracket support bearings 16 and 17 mounted upon the fixed supports 18 and 19. The HTM is admitted through the hollow shaft extension at the right hand end of shaft 15 viewed as in FIG. 2 and is discharged at the left hand end of shaft 15 through the other hollow shaft extension.

The hollow journals 10 and 11 are packed with a temperature and pressure resisting packing indicated at 20 and 21 secured in position against the inner retaining rings 22 and 23 and by means of the screwthreaded confining sleeves 24 and 25. The Stabil-drum 14 has the closed ends 26 and 27 thereof arranged to provide supports for the back-up rings 28 and 29 which have sets of coil springs 30 and 31 extending out of recesses therefrom into recesses formed in retaining rings or ring flanges 22 and 23.

Usually the Stabil-drum shaft 15 serves as a passage for HTM to supply a manifold to deliver the HTM to the outside perimeter of the Stabil-drum 14 through pipes 33 and as a collecting or return manifold 32 through distributing pipes which may number as many as thirty seven distributor pipes for example but only nineteen of which serve as supply pipes 33 to distribute the HTM and eighteen of which actually serve as return pipes 34 to collect the HTM into the return manifold 32. As shown the Stabil-drum shaft 15 is made up of a heavy section steel pipe appropriately machined as shown and having a plug 35 shown in FIGS. 5, 6 and 9 pressed and welded in place. The heavy section steel pipe 15 is provided with a hole 36 in one side and a series of holes to receive distributor pipes 33 which are welded in place. The return manifold 32 is formed by a bent plate or channel section header welded along one side of and parallel to the hollow axis of the shaft 15 and the axis of the Stabil-drum and journals boxed in at both ends at 37 and 38 and covering hole 36. This header section also is provided with a series of holes to accommodate return or collecting pipes 34 parallel and facing the same general direction as in the steel pipe shaft 15, thus forming a collecting and return manifold. Distributor or supply pipes 33 are attached to the holes in the heavy pipe section of shaft 15 or supply manifold and extend through the perimeter surface of the Stabil-drum 14 along one side of the barrier 39, which pipes are also attached to the Stabil-drum surface. Collecting or return pipes are likewise attached to the return or collecting manifold and extend through the perimeter surface of the Stabil-drum 14 along the other side of the barrier 39 and are attached to the Stabil-drum surface.

Means and devices other than described hereinbefore may be employed to conduct the heat transfer medium to and through the Stabil-drum to the heat transfer surfaces.

Figures 4, 5, 6:
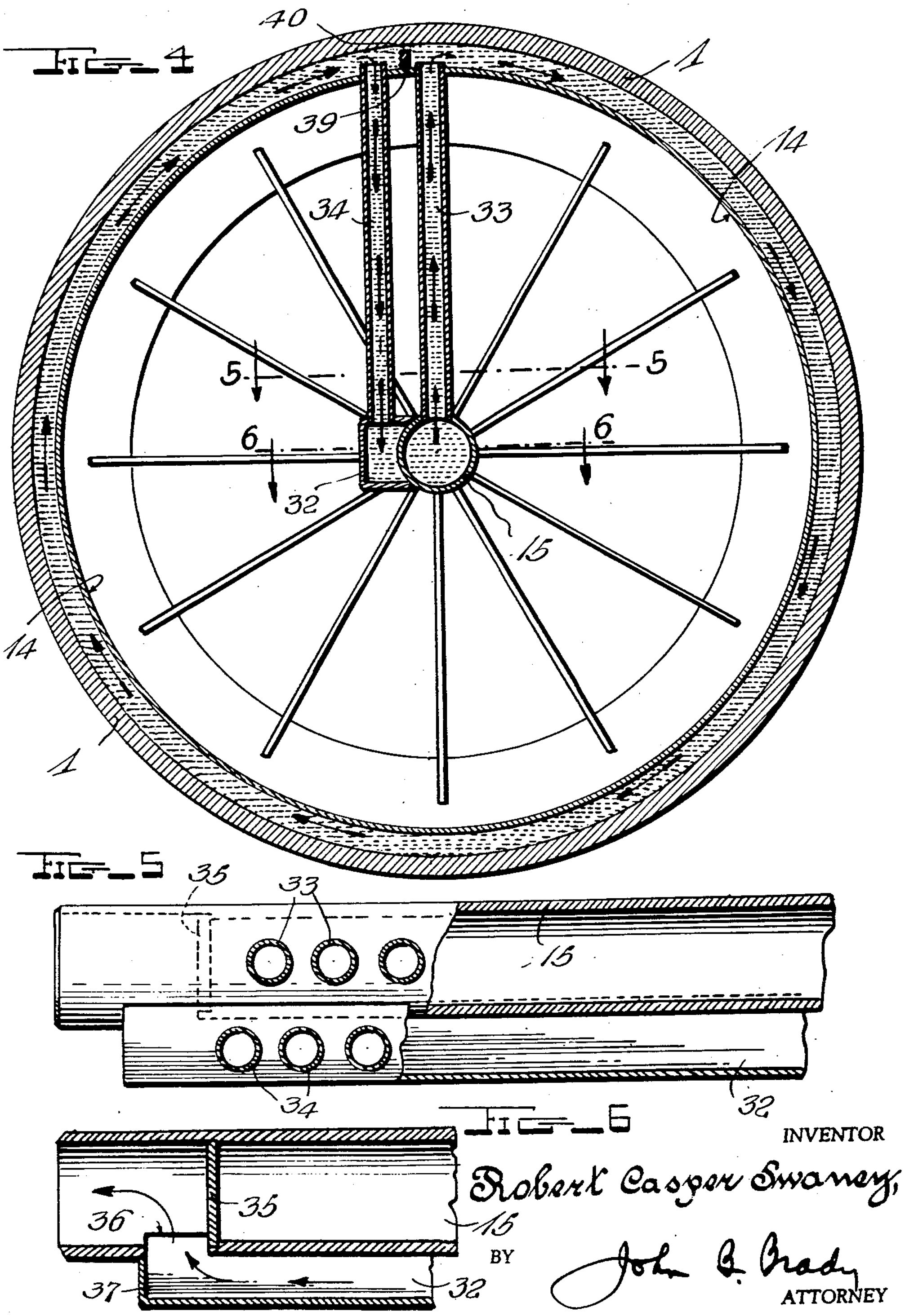
FIG. 4 is a transverse sectional view on line 4—4 of FIG. 2.
FIG. 5 is a fragmentary transverse sectional view on line 5—5 of FIG. 4, illustrating the arrangement of the heat transfer conduits associated with the central tubular shaft and the manifold connected therewith, certain parts being shown in top plan view.
FIG. 6 is a fragmentary horizontal sectional view through the central tubular shaft and the associated manifold on line 6—6 of FIG. 4.
Figures 7, 8, 9, 10, 11, 12:
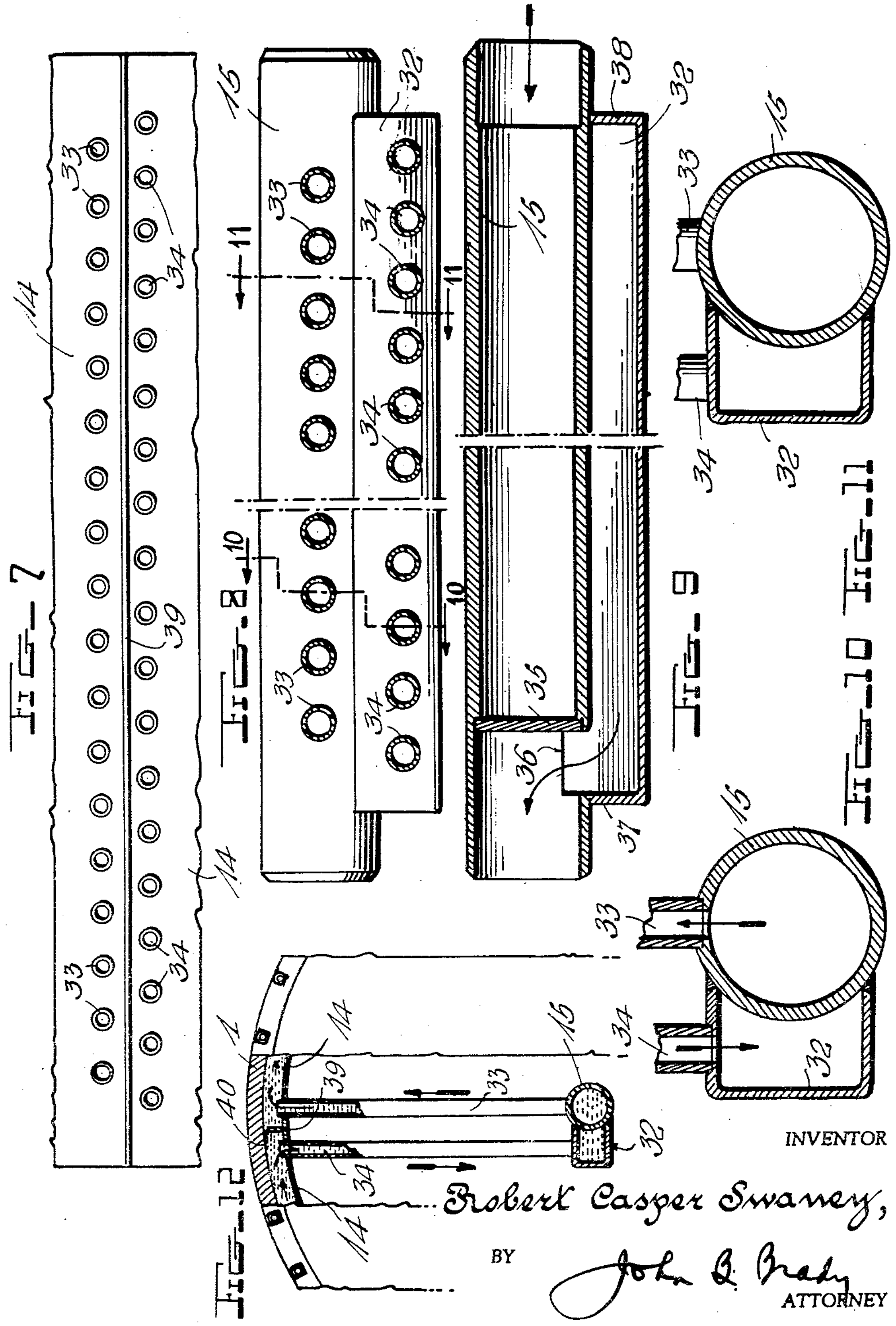
FIG. 7 is a fragmentary plan view looking at the surface of the Stabil-drum interiorly of the drier roll and illustrating particularly the manner in which the heat transfer fluid-conducting conduits project therethrough and the position of the longitudinally extending barrier on the surface of the Stabil-drum.
FIG. 8 is a plan view of the central hollow shaft and the associated manifold and showing the heat transfer fluid-conducting conduits in transverse section, the view being foreshortened in order to show the component parts on a larger scale.
FIG. 9 is a longitudinally extending horizontal sectional view of the hollow shaft and associated manifold illustrated in FIG. 8, the view being foreshortened similar to the view shown in FIG. 8.
FIG. 10 is a fragmentary transverse sectional view on line 10—10 of FIG. 8.
FIG. 11 is a transverse sectional view on line 11—11 of FIG. 8.
FIG. 12 is a fragmentary view showing the connections between the central hollow tubular shaft and the associated manifold, showing the heat transfer fluid-conducting conduits and the connection thereof through the Stabil-drum to the space between the external surface of the Stabil-drum and the internal surface of the drier roll.

The barrier 39 is usually mounted on the outside of the Stabil-drum usually parallel to its axis, although it may be spirally to the axis, between the areas where the heat transfer medium enters and leaves the space between the drier roll and the Stabil-drum 14. As shown in FIGS. 3, 4 and 12 it is a straight member of rectangular section with its width perpendicular to the circumference of the Stabil-drum 14 at a longitudinal element of contact. However, this barrier may be any practicable shape such as an angle, ¼ section of a pipe, a round or square bar, built-up section or even a pipe. The purpose of this barrier is to reduce the clearance at 40 between the Stabil-drum 14 and the drier roll 1 through an area between the entering and leaving HTM sufficient to increase the resistance between the two to force substantially all of the HTM to flow or circulate circumferentially in one direction around the Stabil-drum 14 before exiting. The said resistance may be varied by varying the clearance 40 shown in FIGS. 4 and 12. The clearance 40 will usually be $\frac{3}{32}''$ to ½″ depending upon the HTM used, temperatures, size of unit, speed, etc.

At sufficiently high speed of the drier roll 1 and Stabil-drum 14 being revolved with respect to each other, a pumping action can be established whereby the liquid HTM will circulate through the complete assembly without the aid of an external circulating means; or, reduce the pumping load on the external circulating means. This results from the shear stresses created in the liquid HTM by the movement of the internal surface of the drier roll with respect to external surface of the Stabil-drum, the space between which contains the liquid HTM; the resistance to shear of the liquid HTM creates a drag effect at the two surfaces, part of which follows the moving surface. Thus, a substantially general movement of the liquid HTM occurs in the same direction as the moving drier roll. With no barrier between the surfaces, the liquid HTM within the space between the surfaces would revolve about the Stabil-drum in similar manner to the drier roll. At sufficient speed of the drier roll with respect to the Stabil-drum and with the proper size barrier between the surfaces to create the right amount of resistance between the surfaces at a point between the inlet and outlet, or enough to exceed the resistance in the external piping or conduits, the circulation of the liquid HTM through the system will occur due to the pumping action here described. The energy to perform the pumping action must be supplied by an external circulating means or by the driver for the drier roll. These two energy sources complement each other and the more work performed by the one the less will be required by the other.

Ordinarily a small amount of HTM will be circulated between the heads 2 and 3 of the drier roll and the heads 27 and 26 of the Stabil-drum through clearances 41 to provide as uniform temperature as possible throughout the drier roll and to obviate thermal stresses and distortion, or, for controlling temperature in or at the driven rollheads. Insulation may be applied to the outsides of the drier roll heads 2 and 3 as the economics of the process dictate. The amount of circulation between the said heads can be varied by selectively establishing the clearance 41; thermostat type devices may be used for controlling a valve to emit heat transfer medium into or from the drier roll heads or from or into the supply and the return manifolds or journals to accomplish the same effect.

Referring to FIGS. 17 and 18, due to the effect of the heads 2 and 3 of the drier roll 1 revolving about the Stabil-drum 14, a pumping or circulating action will occur between their respective heads. In some instances, it may be desirable to employ the structure of FIG. 17 where Stabil-drum 14 is supported on hollow shaft 15 by dished and flanged heads 42 and 43 and in such structures I install clearance plates or shields 44 and 45 on the ends of Stabil-drum 14 establishing an optimum clearance 46 between them and the drier roll heads 2 and 3 to minimize this pumping effect and reduce the energy requirements to drive the drier roll 1, even though there is no provision or no desire for circulating the HTM within the drier roll heads. The clearance plates are shown at 44 and 45 terminating in an annular gap **44*a* and 45*a* adjacent the journals for the heads 2 and 3**.

FIGS. 17 and 18 show a structure substantially like that of FIGS. 1–12 in which Stabil-drum 14 is connected with Stabil shaft 15 through HTM supply pipes 33 where the intake is partitioned from the discharge by partition 35 and wherein there is a discharge port 36 in the Stabil-shaft 15 for conducting the HTM through to the discharge position. Drier roll 1 is driven through driver gear 50 as shown. Circumferential guides 51 and 52 are provided on the exterior of the Stabil-drum 14 for confining the effectiveness of the heating area to certain prescribed limits.

In the structure of FIGS. 17 and 18 it will be seen that the HTM flows or circulates as follows: in through a hollow journal and shaft 15 of the Stabil-drum 14, to the plug 35, through the supply pipes 33 into the space between the inside of the drier roll 1 and the outside of the Stabil-drum 14 where it circulates around the Stabil-drum 14, between the heads 2 and 3 as clearances 46, 53 and 62 permit, out the return or collecting pipes 34, which are the same as pipes 34 in FIGS. 1–12, into the return or collecting manifold, through hole 36, into the journal or part of the hollow shaft 15 beyond plug 35, then, out through the other end of the Stabil-drum shaft or journal. However, there are applications and arrangements in which there would be circulation only circumferentially around the space between the drier roll and Stabil-drum with no circulation within the spaces between the heads. The HTM is supplied to the supply pipes 33 from a suitable source which heats the HTM and is discharged to a suitable location. As will be appreciated by those skilled in the art, the HTM may be recirculated and heated during recirculation, as shown in FIGURE 17. The HTM flows through a recirculation conduit **34*a* and natural circulation may be relied upon or a pump 34*b* may be employed. A heater 34*c* may be connected in the conduit 34*a* for heating the fluid to a desired temperature before returning it to the supply pipes 33**, and the heater may be of any conventional type using heat exchange means for raising the temperature of the HTM.

To utilize the full benefit of my invention and obtain the highest efficiency it is desirable in most operations to have the drier roll operating at a uniform heat or temperature throughout its working surface. This is accomplished by a uniform flow or circulation of HTM obtained by "porting" the holes in the supply pipes 33 as shown more clearly in FIGS. 19–23. This creates a drop in pressure so that at the same pressure an equal amount flows through each orifice or port of equal size and shape. The theory of equal pressure as applied here is based upon Pascal's law. Since physical shapes and construction problems often dictate the number and position of supply and return pipes it is sometimes necessary that the end pipes deliver and collect more HTM than the intermediate ones or vice versa. This is clearly shown in FIGS. 19–23, the end pipes being displaced further inwardly than the spacings between the intermediate pipes and the flow or circulation through clearances 41 or 46 require that additional HTM be supplied through the end pipes. This may be provided for by arranging that two end holes "drilled through" in the supply manifold, shaft 15, are larger than the intermediate holes, that are of the order of $\frac{9}{16}''$ to $\frac{7}{16}''$. Then, it is sometimes advisable to port the holes in the return or collecting manifold 32 to create a slightly perceptible pressure drop to maintain uniform leaving flow or circulation of the HTM as well as a uniform entering flow or circulation. This is provided by "drilling through" all holes in the collecting or return manifold where the holes are of the order of 1¼". It does not seem practicable to vary the ports in the return manifold in most cases but there could well be processes that would require variation similar to that indicated above, in the supply and return manifolds.

Instead of porting the holes in the manifolds as described above the supply and return pipes may be equipped with any convenient type of valve, cock or metering device that can be varied or adjusted to vary or regulate the flow in each pipe. FIGS. 19–23 show such valves on the supply pipes 33 but they could be on the return pipes 34 or on both supply and return pipes 33 and 34 as requirements might dictate. FIGS. 20–23 illustrate two representative types of metering valves.

Instead of porting the holes in the manifolds or installing valves or throttling devices as described above the supply and/or return pipes may be equipped with some suitable removable orifice discs or plates to accomplish the same results. In either case the flow or circulation is controlled or established as desired. It will be understood that the control of these valves is manually effected and that the installation of the type of Stabil-heat drier depicted in FIG. 19 is of very substantial magnitude and that the rolls are so large that a set of registering manholes and associated covers are provided in one of the heads of the Stabil-drum such as the head 26 and in the head 2 of the drier roll 1. These manholes and their associated covers may be aligned in the Stabil-drum and in the drier roll and unfastened to admit a man who climbs within the roll to pre-set the valves illustrated in FIGS. 19–23.

The valve shown in FIG. 20 is a needle-type valve shown at 55 having a valve head adapted to close the connection between the Stabil-drum shaft 15 and the supply pipe 33. The needle valve 55 has a stem 56 which projects through the opposite side of the Stabil-drum shaft 15 and through a packing gland 57 therein and through the valve bonnet and yoke 58 where the screwthreaded end thereof is engaged by a fastening nut 59 which is adapted to clamp the valve in closed position with the valve 55 seated against the port leading to the supply pipe 33 or to clamp the valve in any open position.

In lieu of the valve structure shown in FIG. 20 I may employ the valve shown in FIG. 21–23 wherein the damper plate or vane or butterfly valve 60 located in supply pipe 33 may be turned by adjusting the screwthreaded shaft 61 exteriorally of the supply pipe 33 for closing or opening the path through the supply pipe 33.

Thus, it will be observed that the temperature can be graduated from one head of the drier roll to the other by proper porting or throttling which would vary the volumn and velocity of the heat transfer medium accordingly.

A guide or guides 51 and 52 as shown in FIG. 19 may be added extending circumferentially around the exterior of the Stabil-drum 14 which would substantially divide the flow or circulation and rates thereof into zones displaced between the heads 2 and 3 of the drier roll 1. Then, by porting or throttling as previously described, the rates of flow or circulation within each zone may be controlled or varied and corresponding variations in temperatures and/or heat transfer would result. Clearances 62 between guides 51 and 52 and inside of the drier roll might vary from 3/64" to 3/8" depending upon the HTM used, temperatures, size of unit, speed, etc.

The Stabil-drum 14 may be equipped with a two-compartment header in the perimeter or along the perimeter of the cylindrical vessel of the Stabil-drum for distribution and collection of the HTM as shown in FIGS. 24–31, in which case the steel pipe 15 is plugged in a manner similar to plug 35 in FIGS. 1–12 and 17–19 for the same reason as hereinbefore explained. In the form of my invention shown in FIGS. 24–31 the plug is designated as 65 and is usually located centrally of the Stabil-drum shaft designated as 66. Supply pipes 67, 68 and 69 and return pipes 70, 71 and 72 are attached between the box header 73 and hollow shaft 66 to deliver and return the HTM to and from the box header respectively. The number of pipes on the supply and return have no particular significance except for facility. The size of the box header 73 is such that the HTM will flow with a minimum of resistance so that the clearances 74 will act as weirs or orifices between the inside surface of the drier roll 1 and the sides of the box header 73 to uniformly distribute and collect the heat transfer medium. The center divider 75 of the two-compartment box header should extend sufficeintly toward the inside surface of the drier roll 1 to create sufficient resistance as shown by clearance 40 to force substantially all heat transfer medium to flow circumferentially around the space between the inside of the drier roll 1 and the outside of the Stabil-drum 14 and generally circumferentially in one direction within the spaces between their cylindrical surfaces and heads. If the volume and velocity of HTM must be varied it may be done by shaping the extended sides of the box header 73 forming weirs so that clearances 74 proportionally vary as required from head to head of the drier roll or where needed throughout the lentgh of the box header.

The clearances 74 may be increased to the point they are not effective to uniformly distribute or collect the HTM and instead cover plates 76 may be provided over the compartments of the box header with any convenient pattern of holes, slots, openings or orifices 77 to enclose the compartments of the box header to accomplish the desired results, as indicated in FIGS. 28 and 30.

On some installations it is desirable to have the inlet and outlet on the same side of the machine. This is very easily provided in my invention. On all variations this can be accomplished in two ways: First, by inserting a pipe or tube within the hollow shaft and hollow journal or shaft extension of the Stabil-drum and attaching it to the opening desired as shown in FIG. 26 or by use of the arrangement in FIG. 35, which shows said pipe closed at the inside end and provided with a long slot-like opening with the necessary flanges or connecting devices to attach, usually by fusion welding, to the opening out of the shaft pipe 66 into the box header. FIG. 35 shows the said pipe attached to the supply header but it could just as well be attached to the return header. Also the pipe could be fitted with an elbow or other suitable fitting, in turn welded into an opening in the shaft pipe 66 to receive the returning heat transfer medium. In this arrangement the pipe would be sealed into the end of the hollow shaft extension or journal of the Stabil-drum by means of a suitable stuffing box arrangement or closure to accommodate expansion and contraction. Also this may be accomplished by inserting a pipe or tube within the hollow shaft extension or journal and hollow shaft of the Stabil-drum, and passing the said pipe through plug 65. This is shown on FIG. 26. The pipe may be a close slip fit into and through the plug or the plug may be attached to the pipe and the plug a close fit within the shaft pipe. Either way is acceptable and is to accommodate expansion and contraction. In this latter arrangement the pipe could be installed by means of a flange attached to the pipe and the flange gasketed and bolted to the shaft extension or journal part of the Stabil-drum. In either arrangement rotary joints are not required and the Stabil-drum would be equipped with only one hollow shaft extension or journal, and the other could be solid.

The Stabil-drum construction may be modified as indicated in FIG. 31A to provide a single box header for the supply pipes only. In the arrangement shown in FIG. 31A the supply pipes indicated generally at 67 extend from the hollow shaft 66 to a single compartment header of the box type shown at 78 in the Stabil-drum 14. Only one set of supply pipes indicated at 67 is required in this instance, as the Stabil-drum is perforated as indicated at 79 providing for the return of the HTM through the arrangement of aperture 36 in the hollow tubular shaft 15 of the Stabil-drum 14 as described in connection with the form of my invention shown in FIGS. 1–12 and 17–19, in which case Stabil-shaft 15 does not have a box header 32. The single compartment box header 78 connected with the supply pipes delivers the heat transfer medium over the surface of the Stabil-drum while the apertures 79 provide for the circulation of the HTM to the discharge end of the system.

In some critical processes excessive change in temperature between the area on the drier roll at which process material makes contact with the drier roll and the area where it is removed or breaks contact with the drier roll, is undesirable. For such processes the Stabil-drum 14 may be equipped with a by-passing device such as pipes installed as shown in FIG. 27 at 80. The by-pass may be a tunnel, slots or divided segments and a barrier, or two barriers as shown in FIG. 27 at 81 and 82, to create resistance that will cause substantially all of the moving HTM to leave the space between the Stabil-drum 14 and the drier roll 1, flow through the by-passing arrangement 80 and re-enter the space between the Stabil-drum 14 and the drier roll at the areas of departure and contact (of the process material with the outside or working surface of the drier roll), with the drier roll respectively, the HTM between the Stabil-drum 14 and drier roll 1 between the said areas of departure and contact remaining substantially stagnant and little or no heat transfer taking place.

The areas of contact and departure of the material from the drier roll in many processes will not be critical as to their position with respect to the entering and leaving HTM within the space between the inside of the drier roll and the outside of the Stabil-drum, and therefore the Stabil-drum would normally be installed with the HTM entering and leaving said space at or near the top of the Stabil-drum and drier roll. However, in some processes it might be desirable or necessary to apply both the process material and the entering HTM at areas opposite each other or at areas below the top or even at the bottom of the Stabil-drum and drier roll, in which cases these areas will be determined by the processes. If the drier roll operates at peripheral speed of the HTM or higher no change in heat transfer characteristics should occur. But if the drier roll speed is less than the rimming speed of the HTM, the HTM might not completely fill the space between the Stabil-drum and drier roll in the upper element. So, if complete filling of said space is desired or necessary an eductor tube or tubes 83 as shown in FIGS. 19 and 56 should be installed extending through the Stabil-drum circumference from as near the top of the drier roll cavity as possible into the return portion of the hollow shaft 15 or exit journal so that the latter end of the tube or tubes will extend down-streamwardly into the return portion of the hollow shaft 15 or associated hollow exit journal of the Stabil-drum 14 and act as a venturi, in which case the leaving HTM by its velocity will create a negative pressure in said eductor tube or tubes 83, evacuate all voids in the apparatus and automatically maintain it full of HTM at all times under normal operating conditions.

In some processes it is desirable or necessary to adjustably position the areas of the entering and leaving HTM with respect to the points of contact and departure of the material from the drier roll surface, in which cases the Stabil-drum assembly is equipped with an apparatus, mechanism or device for adjustment by rotating it about its axis, such as a self-locking worm 84 and worm wheel 85 as shown in FIGS. 19 and 19A, with casing and supports omitted to simplify the drawing. However, this positioning device may be a rack and pinion, gearmotor, clutch and drive mechanism, lever, cam or linkage as choice might determine.

The Stabil-drum is often supported by its own external bearings or brackets and the drier roll on its own journal bearings; although there are variations as will be noted elsewhere herein. Ordinarily, the Stabil-drum and drier roll each have one fixed support, usually the drive side, and one movable, floating or sliding support, usually the tending side, which arrangement facilitates their independent expansion and contraction without misalignment.

Although my invention will be applied principally as described above it is equally applicable to an application in which the drier roll or external cylinder 1 remains stationary and the Stabil-drum 14 revolves about its axis as shown in FIGS. 42 and 43; when neither drier roll or Stabil-drum revolve; and when both drier roll and Stabil-drum revolve in either the same or opposite directions. In FIGS. 42 and 43 Stabil-drum shaft 15 extends through the bearings and stuffing boxes indicated at 86 and 87 carried by fixed supports 88 and 89 with respect to which Stabil-drum 14 rotates but with respect to which the drier roll 1 is stationary. The extensions on shaft 15 terminate in rotary joints 90 and 91 through which the heat transfer medium passes. The remaining parts of the structure are similar to the forms of my invention heretofore explained.

In the form of my invention illustrated in FIGS. 32–41 heretofore alluded to it will be noted that the HTM is directed in its path of movement from hollow shaft 66 through a flat unsymmetrical funnel-shaped structure 92 which terminates in supply apertures in the surface of the Stabil-drum 14 as represented at 93. The discharge for the HTM is formed by a similarly funnel structure 94 which terminates in the slot 95 in the surface of the Stabil-drum 14 as shown. The two funnel-shaped structures 92 and 94 extend in the immediately adjacent planes represented in FIGS. 33, 34 and 36. A variety of methods may be provided for controlling the path of movement of the heat transfer medium with respect to hollow shaft 66; that is, where the HTM enters at the left in the form of construction shown in FIGS. 32–34 and discharges at the right; or where the heat transfer medium enters and discharges at the same end as in the structure of FIGS. 35–41. In the latter event the hollow shaft 66 is divided longitudinally by a baffle 96 which leads to chambers at the left hand end of the journal into which the HTM is centrally supplied through the intake pipe 97 passing into the chamber 98 represented in FIG. 37 and into the supply funnel 92. Similarly the discharge funnel 94 connects to the chamber 99 which leads to the discharge pipe 100 at the left of the structure for separating the entry and the discharge of the HTM at the same end of the structure.

The static loads on the bearings or supports will be the algebraic sums of the proportional weights of the drier roll, the Stabil-drum, the heat transfer medium in the apparatus and the heat transfer medium displaced by the Stabil-drum. When the Stabil-drum is a liquid-tight vessel and the heat transfer medium is a liquid: the static loads on the roll bearings will equal the total weight of the drier roll plus the weight of an equivalent amount of heat transfer medium to completely fill the drier roll and these loads will be vertically downward. The support loads on the Stabil-drum supports or bearings will be equal to the total weight of the heat transfer medium displaced by the Stabil-drum less the weight of the Stabil-drum and these loads will be vertically upward; except in the case of small Stabil-drums, or any size where the Stabil-drum is not buoyant, then the loads on the Stabil-drum supports or bearings will be the difference between the weight of the Stabil-drum and the weight of the heat transfer medium displaced by the Stabil-drum and these loads, too, will be vertically downward. In most cases the Stabil-drum is buoyant within the drier roll, and will vary with the size of the apparatus and the heat transfer medium used. When the Stabil-drum is used with a gas or vapor all loads will be vertically downward as described immediately above. When the Stabil-drum is not a gas, vapor or liquid-tight vessel as described above, or for some other reason is constructed with means to permit entrance within the Stabil-drum of the HTM to equalize pressure within and without the Stabil-drum, the static loads on the Stabil-drum supports or bearings will equal the total weight of the Stabil-drum; and the static loads on the drier roll bearings and journals will be the sum of the drier roll and the HTM to fill the voids between the drier roll and Stabil-drum structure, less the weight of the HTM displaced by Stabil-drum structure, and the forces will be vertically downward.

In some applications it may be desirable to construct the Stabil-drum as a pressure equalizing vessel instead of as a liquid, gas or vapor-tight vessel, either because the HTM might be at pressures too high for economical construction of the Stabil-drum to withstand the collapsing forces or for some other reason. In such cases one or more conveniently located holes would be made in the Stabil-drum to equalize the pressure and neutralize the collapsing forces; or, to assure adequate venting or filling of the Stabil-drum with heat transfer medium as indicated generally by holes 79 in Stabil-drum 14 of FIG. 31A.

One of the particular advantages of my invention is the relatively small amount of heat transfer medium within the apparatus at any one time, which facilitates rapid change of temperature and response to control. This is particularly true when the Stabil-drum is liquid, gas or vapor tight. When the Stabil-drum is pressure equalized and full or partly full, of heat transfer medium the response to temperature change and control is slower but the controlled flow or circulation is immediately more effective than in the case of drier rolls completely filled with heat transfer medium which first must be tempered and changed and its effect then transferred to the drier roll. In the conventional drier roll this would usually be evidenced in a much longer lag in the response.

Stuffing boxes to contain the HTM within the apparatus are formed between the journals of the drier roll 1 and the journals or shaft extensions of the Stabil-drum 14 as shown in FIGS. 44–55.

The stuffing box shown in FIG. 44 consists of the inside surface of the drier roll journal or sleeve 11, the outside surface of the Stabil-drum journal 101 or extension of shaft 15, a packing retainer assembly shown at 28, 30, and 22 on the Stabil-drum journal or shaft extension between the Stabil-drum 27 and the inside hub of the drier roll journal or sleeve 11. The packing 21 and 20 and retainer assembly comprises a carbon-graphite retainer holder 22 and 23 shown in FIGS. 2 and 44, backup plates 27 and 28, loading springs 30 and 31, and confining sleeves 24 and 25, as heretofore described which hold the packing retainer assembly against the inside hub face of the drier roll journal. The force on the inside hub of the drier roll journal is substantially greater than the normal force of the packing gland device. The packing 20 and 21 consists of a series of packing rings, a soft, plastic or pliable commercial packing suitable for the temperatures and HTM to be used. A spring loaded packing gland 103 as shown in FIG. 19 has its force applied by means of adjusting screws, springs, etc. 102, as shown, mounted on the support bracket of the Stabil-drum shaft or some other convenient arrangement on the Stabil-drum journal or shaft extension by means of which force can be applied to the packing gland to force the packing rings 21 and 20 against the packing retainer so that the packing rings as they are compressed displace inwardly and outwardly to bear against the surfaces of the stuffing box to effectively seal the HTM in the apparatus at these points. Since the packing gland, packings and retainer are stationary with respect to the Stabil-drum, the inside surface of the hollow drier roll journal will wipe the outside surfaces of the packings, and the face of the inside hub of the drier roll journal will wipe the face of the packing retainer. The packing gland may be positively loaded by confining sleeves 24 and 25 instead of being spring loaded, as shown in FIGS. 2 and 44.

In FIG. 44 it will be seen readily that since the Stabil-drum 14 and drier roll 1 are mounted on different supports, and even though properly aligned, there will be displacement of the Stabil-drum 14 with respect to the drier roll 1 in normal operation and unless provision is made for it the stuffing boxes will not function efficiently. But this is provided for in my invention. A reasonable amount of clearance shown at 108 and 108' is provided for between the packing glands 103, FIGS. 45, 46, 52 and 53 and the inside surface of the drier roll journals 10 and 11 but only a neat sliding fit is provided between the packing gland 103 and the Stabil-drum shaft extension or journal 101 as shown in FIG. 45. Lateral deflection of the Stabil-drum shaft extensions or journals 101 in any direction will cause the soft, pliable or plastic packing rings 20—21 to displace about them but remain in sealing contact with the inside surfaces of the drier roll journals 10—11. The carbon-graphite packing retainer 103 with its assembly will permit the misalignment without binding because the face of the packing retainer and the face of the inside hub of the drier roll journal 10—11 are in parallel planes substantially normal to the misalignment, and perpendicular to the drier roll journal 10—11 and Stabil-drum journal 101 or shaft extension axes.

Since the two packing retainer assemblies are mounted on the journals or shaft extensions of the Stabil-drum between the heads of the drier roll 1 and Stabil-drum 14, they will compensate for any uneven expansion or longitudinal movement of the Stabil-drum 14 with respect to the drier roll, and the only effect will be a corresponding change in the pressure of the packing retainers 103 against the faces of the inside journal hubs of the drier roll and the heads of the Stabil-drum which properly engineered will produce no adverse effects.

The stuffing box arrangement described relative to FIG. 44 provides for only limited misalignment or displacement whereas the other type described next below shown in FIGS. 45–46 and FIG. 55 provides for maximum variation in deflection, misalignment, expansion and contraction.

The stuffing box shown in FIGS. 45–46 consists of the inside surface of the drier roll journal 10, the outside surface of the Stabil-drum journal 101, or shaft extension, a shoulder 104 on the Stabil-drum journal 101 or shaft extension, a series of packing rings 20 which are usually soft, pliable or plastic commercial packings suitable for the temperatures and HTM to be used, a pair of deflection seal rings 105, and a packing gland arrangement either spring loaded or positive type.

The shoulder 104 on the Stabil-drum journal 101 or shaft extension may be replaced by a sleeve, or ring, to perform the same function. This is shown in FIG. 55 where sleeve 106 is interposed between shoulder 104 and deflection-seal ring 105. Or, the stuffing box may be fitted with two packing glands, one at each end of the drier rolling journal 10, and they may be spring-loaded or positive type.

The packing gland and shoulder, ring, sleeve or second packing gland have a smaller outside diameter than the inside diameter of the drier roll journal 10—11 sufficient to accommodate the maximum allowable deflection of the Stabil-drum journal or shaft extension without rubbing the inside surface of the drier roll journal. The inside diameter of the packing gland or glands 103, if two are used, should have a neat sliding fit on the outside diameter of the Stabil-drum journal 101 or shaft extension.

In FIG. 45 I have shown the normal position of the journal 10, shaft extension 101, and associated packing 20. I have indicated the normal clearance at 107 and 108 at opposite ends of the journal. In FIG. 46 I have indicated the dynamic change which may occur and for which the stuffing box arrangement in the journal of my invention is constructed to compensate. The shaft deflection in FIG. 46 have caused the clearance to change from the condition shown in FIG. 45 at 107 and 108 to the conditions shown in FIG. 46 at 107' and 108'. In FIGS. 52–54 I have indicated at different transverse sections along the journal the conditions of the clearances 107' and 108' and also the condition of the unsymmetrical compression of the packing rings 20'.

The deflection-seal rings 105 should have an outside diameter to give a free running or revolving fit to the inside diameter of the drier roll journal 10. The inside diameter of the deflection-seal rings should be sufficiently larger than the outside diameter of the Stabil-drum journal 101 or shaft extension to accommodate the maximum allowable deflection without rubbing the Stabil-drum journal or shaft extension. One side of the deflection-seal ring 105 should be perpendicular to its axis; the other side may be conical, spherical, bevelled or parallel with respect to the first side depending upon the strength required and the type of packing, as shown in FIGS. 47–51 at 105, 105', 105'', 105''' or 105$^{IV}$. The inside edge of the deflection-seal ring should be thin enough to displace the packing from the packing gland, ring, sleeve or shoulder when deflection occurs. The deflection-seal rings may be made of any suitable material. Some designs and applications may dictate the use of washers, rings or bearing plates made of carbon-graphite, brass, bronze, or other material between the packing gland, ring, sleeve or shoulder and the deflection-seal ring.

The Stabil-drum journal or shaft extension, the packing gland, deflection-seal rings, packings and shoulder or ring, sleeve or second packing gland will usually remain stationary with respect to the drier roll journal and the drier roll journal will wipe the outside surfaces of the packings and effectively seal the apparatus at these points.

It will be seen readily from FIGS. 46 and 52–54 that the Stabil-drum journal or shaft extension can be deflected considerably with respect to the axis of the drier roll which revolves about its own center axis, without destroying the efficiency of the stuffing box. This is clearly shown in FIG. 46. The deflection-seal rings 105 contain the packings within the desired area of the stuffing box when deflection of the Stabil-drum journal or shaft extension occurs with respect to the journal of the drier roll, and permits the displacement of the packings to accommodate themselves to the displacement within the desired area of the stuffing box.

The stuffing boxes described last above are particularly for use on such apparatus as drying rolls, flaking rolls, etc. where the Stabil-drum is stationary and the outside or female part of the stuffing box revolves; or, where it is desirable or necessary to cool the sealing surface of the stuffing box, in which case the female or inside surface of the stuffing box and the outside surface of the packings can be cooled directly by adding outside cooling fins or a cooling medium jacket. But they are equally efficient where the shaft revolves and the stuffing box remains stationary thereto.

When the shaft revolves and the stuffing box and packings remain stationary the construction is usually as follows: The shoulder is on the inside surface of the female part of the stuffing box instead of the shaft and the packing gland and shoulder or other device should have a smaller outside diameter than the inside diameter of the female part of the stuffing box sufficient to accommodate the maximum allowable deflection or misalignment without rubbing the inside diameter of the female part of the stuffing box; the outside diameter of the packing gland should be a neat sliding fit to the inside diameter of the female part of the stuffing box; if a ring, sleeve or second packing gland is used in lieu of a shoulder on the inside surface of the female part of the stuffing box, the design is the same; the inside diameter of the reflection seal rings should be a free running or revolving fit to the outside diameter of the shaft; the outside diameter of the reflection seal rings should be sufficiently smaller than the inside diameter of the female part of the stuffing box to accommodate the maximum allowable deflection; the outside edges of the deflection-seal rings should be thin enough to displace the packings from the packing gland, ring, sleeve or shoulder when deflection or misalignment occurs; the sides and cross section of the deflection-seal rings may be similar to the descriptions in FIGS. 47–51 except that the cross sections thereof are reciprocal.

The packing gland, packings and deflection-seal rings turning with the shaft, and the female part of the stuffing box stationary with respect thereto, will function efficiently on slower turning shafts but will permit less deflection when used with currently available commercial packings.

The packings in the stuffing box may be extended to any practicable length as long as said length is less than the length of the drier roll journal through the hubs. This also provides effective insulation for the journal bearings of the drier roll against the temperature or heat of the HTM because most packing materials and most heat transfer media possess considerably less thermal conductivity than materials used in rolls, journals, shafts, etc.

The bearings for the drier roll 1 may be installed on the Stabil-shaft 15 inside the drier roll journals as shown in FIG. 17. The bearings 109 and 111 are for radial load and the bearings 112 and 114 are for thrust load, but combination radial and thrust load bearings may be used. Expansion and contraction between the Stabil-drum 114 and the drier roll 1 is accounted for in any of the forms of my invention by adequate clearances.

Referring to FIG. 17, the bearings 109' and 111' for the drier roll 1 may be mounted on the outside of the drier roll journals as shown and spacing or alignment bearings 109 and 111 mounted between the inside of the drier roll journals and the Stabil-shaft 15; with some torque means attached to the Stabil-shaft 15 to keep the Stabil-shaft on which is mounted the Stabil-drum 14, from turning.

The Stabil-drum journals or shaft extensions are ordinarily insulated inside to further protect the drier roll journal bearings and packing gland against the temperature or heat of the HTM. This insulating device consists of an insulation holder, usually a formed metal sleeve to contain the insulating material, and the insulation retainer as shown at 110 in FIGS. 44–46 and FIG. 55. The insulating material may be almost any inert material having insulating qualities that will withstand the temperatures to be encountered and remain inert toward the HTM. Usually there is no attempt to seal the HTM from the insulation holder, especially when the HTM is a natural, refined petroleum oil, methylene chloride or something comparable thereto, because as long as the insulating material is inert toward the HTM and the equipment, it would hold the heat transfer medium motionless within the insulation holder so it could not convect within the insulation holder, and thus the two would effectively insulate. The insulation holder usually is a metal tube of proper length and diameter with an external flange on one end substantially perpendicular to its axis. The outside diameter of the insulation holder and the inside diameter of the Stabil-drum's hollow journal or shaft extension define the thickness of the insulation and the space between the two contain the insulating material. The bore of the Stabil-drum journal 15 or shaft extension may be fitted with a shoulder against which to seat the insulation holder flange, as shown in FIGS. 44–46 and in FIG. 55. This provides positive location of the insulation but it is not necessary to the proper functioning of the apparatus. The insulating material most often used is asbestos rope, yarn or packing rings. The insulation retainer is usually a flat ring fitting over the outside diameter of the insulation holder and into the bore of the Stabil-drum journal or shaft extension. After installing the insulation retainer the tube of the holder may be flared or rolled outwardly to keep the retainer in place. Also, the insulation retainer may be tack welded three or four places around its perimeter to the inside of the bore of the Stabil-drum journal 15 or shaft extension to hold the assembly in place. The insulation to be most efficient should extend beyond and include all the area between the areas where the drier roll journal bearing and the packing gland are mounted.

The flow or circulation of the HTM may be reversed in any of the herein described arrangements of my invention and they will function successfully although in some cases not as efficiently, except when equipped with eductor tubes such as 83 in FIG. 19 and operated as hereinbefore described, in which case duplicate eductor tubes $83^{I}$, $83^{II}$, $83^{III}$, $83^{IV}$, etc., will be required as shown in FIG. 56 feeding into the supply portion as the supply portion as shown in FIG. 19 similarly located and to discharge as shown on FIG. 19 in what would be upstreamwardly into the hollow shaft 15 so that when reversed these duplicate eductor tubes would function as those illustrated in FIG. 56.

All of the herein described arrangements of my invention will function successfully with the HTM flowing around the circumference of the Stabil-drum with or counter to the direction of rotation of the drier roll.

All of the herein described arrangements of my invention will function successfully with the drier roll stationary or in motion. In most cases closer clearances between the elements of the Stabil-drum and drier roll would be desirable for a permanently stationary drier roll and Stabil-drum.

All of the herein described arrangements of my invention will function successfully with the Stabil-drum revolving and the drier roll stationary in which case it is necessary to equip the Stabil-drum with rotary joints to deliver the heat transfer medium to and return it from the Stabil-drum.

All of the herein described arrangements of my invention will function successfully with the axis of the complete apparatus in any position.

My invention is best adapted to use with heat transfer media which involve sensible heat although it will work with special adaptations when used with condensing or evaporating vapors. Liquid heat transfer media produce the best results and efficiencies. When using heat transfer media such as liquids, gases or super-heated vapors, heat transfer is based entirely upon sensible heat in terms of mass, specific heat and temperatures. Therefore, the heat to be transferred is directly dependent upon the functions of velocity, specific heat, mass and temperatures, which are usually controlled or regulated by sensing temperatures directly so that temperature measuring controllers can be used to directly regulate or control the mass of heat transfer medium circulated, directly proportional to the work to be performed, or heat to be transferred. This is the most accurate and reliable method of controlling heat transfer. Whereas, in the case of condensing or evaporating vapors, temperature is a function of pressure, therefore control is subject to two different variables, which if out of balance are inaccurate and unreliable, hence require considerable equipment and instrumentation, as well as maintenance, for efficient operation of heat transfer or heat exchange apparatus even at temperatures within practicable pressure limits. For example: a steam heated vessel might have 100 p.s.i.g. pressure but be full of water at only 100° F. instead of saturated steam at 338° F., but the pressure sensing instruments would have no way of determining that error.

A distinct advantage of my invention when applied to the drying of paper is the ability to confine the circulation of the heat transfer medium within the Stabil-heat drier to coincide exactly with the width of the web or sheet of paper. Referring to FIGS. 17–18, for example the drier might have an overall face width of 200 inches of a paper machine designed to make paper 180 inches wide. Thus, there would be the equivalent of 10 inches width, circumferentally around each side of the drier not covered by paper which would not be performing work. Therefore, these portions and the heads would be overheated and radiation losses would be high. Whereas, using my invention in such a drier with two circumferential guides 51 and 52 as shown in FIG. 17, spaced 180 inches apart to confine the flow of the HTM in one zone under the surface of the drier in contact with the paper, and only a minimum of HTM flowing in the end zones and head areas, the end zones and heads would remain at minimum temperatures and the radiation losses sharply reduced. Further, preventing the overheating of the end zones and heads would reduce the excess drying effects at the edges of the paper and sharply reduce or eliminate completely the thermal stresses in the drier structure. In other processes such as in flaking rolls, etc., this is likewise a very distinct advantage. The metering valve arrangements of the form of my invention shown in FIGS. 19–23 also provide for very precise control of the heating area.

Wherever the rotative system includes parts which are unsymmetrical and that revolve, ample provision is made to statically or dynamically balance the rotative system by means of appropriate means of counter weighting.

FIGS. 57 and 58 show the basic construction of the several forms of the Stabil-heat drier of my invention. The heat transfer medium enters at the left through the Stabil-shaft 15 and passes through the several tubes indicated at 33, **33*a*, and 33*b* extending to the exterior of the cylindrical surface of the Stabil-drum 14 where the HTM distributes in a film throughout the annular space between the inside surface of drier roll 1 and the outside surface of Stabil-drum 14. The heat transfer medium also passes inwardly through ports 79 in the surface of Stabil-drum 14 and through the discharge aperture 36 in the Stabil-shaft 15. As heretofore explained, Stabil-shaft 15 is partitioned at 35 so that the heat transfer medium can move only toward the right and is discharged out of the right hand end of the Stabil-shaft 15**.

Some of the advantages of my invention are recapitulated as follows:

I. Rapid response to temperature control due to:
  (*a*) The relatively low mass of heat transfer medium within the apparatus in relation to the total mass of apparatus.
  (*b*) High velocities of the heat transfer medium in relatively small cavities.

II. High velocities of the heat transfer medium through the apparatus with very low resistance.

III. Very sensitive and accurate temperature control.

IV. Very high heat transfer rate due to:
  (*a*) High velocities of the heat transfer medium.
  (*b*) Extreme turbulence of the heat transfer medium within the apparatus.
  (*c*) Multiple shear within the heat transfer medium between the Stabil-drum and the drier roll.

V. Accurate control of the circulation or flow pattern of the heat transfer medium to assure uniform or controlled as well as efficient heat transfer.

VI. High temperature or low temperature heat transfer with lowest practicable pressure. For example: with only 3 heat transfer media the same apparatus can be used to transfer heat equally efficiently from temperatures as low as —140° F. to as high as 650° F., at pressures less than 15 p.s.i.g.

While I have described my invention in certain of its preferred embodiments I realize that modifications may be made and I desire that it be understood that no limitations upon my invention are intended except as may be imposed by the scope of the appended claims.

What I claim as new and desire to secure by Letters Patent of the United States, is as follows:

1. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, and a drainage line communicating with said second orifice means and leading through one of said heads.

2. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, a drainage line communicating with said second orifice means and leading through one of said heads, and a heater for said fluid receiving the fluid from the drainage line and feeding it into the inlet line.

3. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first and second orifice means in said first shell, said orifice means being in peripherally spaced relation and extending throughout the length of the roll, said inlet line feeding fluid through said first orifice means into said chamber, and a drainage line communicating with said second orifice means and leading through one of said heads.

4. A method of heating a rotating dryer drum shell, which comprises confining an annular body of non-volatile heat exchange liquid between the inside of the shell and a closely spaced stationary surface to effect turbulence in the liquid, forcing a predetermined amount of hot liquid into said body and withdrawing an equal amount of spent liquid therefrom.

5. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line line leading through one of said heads, first orifice means in said first shell extending the length thereof and communicating with said inlet line to flow the fluid into said annular chamber, second orifice means separate and apart from the first orifice means, in said first shell for withdrawing fluid from said annular chamber, said first and second orifice means being in peripherally spaced relation, barrier means projecting into said annular chamber between said first and second orifice means, and a drainage line communicating with said second orifice means and leading through one of said heads.

6. A dryer drum comprising a first cylindrical shell, a head closing each end of said first shell, a second cylindrical shell receiving the first and closely spaced therefrom to define therewith an annular chamber, a head closing each end of the second shell and defining radial spaces with the heads of the first shell in communication with said annular chamber, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, and a drainage line communicating with said second orifice means and leading through one of said heads.

7. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, means for driving said first shell in rotation, a heat exchange fluid inlet line leading through one of said heads, first orifice means in said first shell extending the length thereof and communicating with said inlet line to flow the fluid into said annular chamber, a second orifice means, separate and apart from the first orifice means, in said first shell for withdrawing fluid from said annular chamber, and a drainage line communicating with said second orifice means and leading through one of said heads.

8. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, means for heating the fluid flowing into the shell through said first orifice means, means for controlling the flow from said first orifice means for obtaining a flow rate differential along the length of the shell so that the temperature along the length may be controlled, second orifice means separate and apart from the first orifice means, in said first shell for withdrawing fluid from said annular chamber, and a drainage line communicating with said second orifice means and leading through one of said heads.

9. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell including a plurality of ports axially spaced the length thereof and communicating with said inlet line to flow the fluid into said annular chamber, second orifice means including a plurality of ports axially spaced along the length of the shell separate and apart from the first orifice means, in said first shell for withdrawing fluid from said annular chamber, and a drainage line communicating with said second orifice means and leading through one of said heads.

10. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell including a plurality of ports axially spaced the length thereof and communicating with said inlet line to flow the fluid into said annular chamber, valve means for said ports individually controlling flow through individual ports for obtaining a flow rate differential through said ports so that the temperature along the shell may be controlled, second orifice means separate and apart from the first orifice means, in said first shell for withdrawing fluid from said annular chamber, and a drainage line communicating with said second orifice means and leading through one of said heads.

11. A dryer drum comprising a first cylindrical shell, a second cylindrical shell receiving the first and closely spaced therefrom to define therewith an annual chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, said orifice means being positioned at the top side of said first shell so that said annular chamber fills with fluid, and a drainage line communicating with said second orifice means and leading through one of said heads.

12. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, an inlet header for fluid at the center of the first shell having radially extending pipes opening through said first orifice means and connected to said heat exchange fluid inlet line, a discharge header at the center of the first shell having radial pipes connecting with said second orifice means, and a drainage line communicating with said second orifice means through said discharge header and leading through one of said heads.

13. A dryer drum comprising a first cylindrical shell, a second cylindrical shell receiving the first and closely spaced therefrom to define therewith an annular chamber, a head closing each end of the second shell, means co-rotatably mounting said second shell and said heads for rotation relative to said first shell, a heat exchange fluid inlet line leading through one of said heads, first orifice means in said first shell extending the length thereof and communicating with said inlet line to flow the fluid into said annular chamber, second orifice means, separate and apart from the first orifice means, in said first shell for withdrawing fluid from said annular chamber, a drainage line communicating with said second orifice means and leading through one of said heads, and ports in the first shell communicating with ends of a flow passage within the first shell and with said annular chamber for flow of fluid out of and into the chamber through said passage without flowing through said orifice means.

References Cited in the file of this patent

UNITED STATES PATENTS

| | | |
|---|---|---|
| 1,649,511 | Cox | Nov. 15, 1927 |
| 2,351,733 | Armstrong | June 20, 1944 |
| 2,437,004 | Rutledge | Mar. 2, 1948 |
| 2,586,829 | Kelsey | Feb. 26, 1952 |
| 2,671,278 | Hinnekens | Mar. 9, 1954 |
| 2,714,538 | Hornbostel | Aug. 2, 1955 |
| 2,724,909 | White et al. | Nov. 29, 1955 |
| 2,837,833 | Coudriet | June 10, 1958 |
| 2,844,887 | Hornbostel | July 29, 1958 |

FOREIGN PATENTS

| | | |
|---|---|---|
| 290,976 | Great Britain | July 4, 1929 |
| 613,662 | Germany | May 23, 1935 |